(12) United States Patent
McCombe et al.

(10) Patent No.: US 12,322,071 B2
(45) Date of Patent: *Jun. 3, 2025

(54) TEMPORAL DE-NOISING

(71) Applicant: MINE ONE GmbH, Berlin (DE)

(72) Inventors: James A. McCombe, San Francisco, CA (US); Christoph Birkhold, San Francisco, CA (US)

(73) Assignee: MINE ONE GmbH, Berlin (DE)

( * ) Notice: Subject to any disclaimer, the term of this patent is extended or adjusted under 35 U.S.C. 154(b) by 622 days.

This patent is subject to a terminal disclaimer.

(21) Appl. No.: 17/588,335

(22) Filed: Jan. 30, 2022

(65) Prior Publication Data
US 2022/0230280 A1 Jul. 21, 2022

Related U.S. Application Data

(63) Continuation-in-part of application No. 17/460,246, filed on Aug. 29, 2021, now Pat. No. 11,960,639,
(Continued)

(51) Int. Cl.
*G06T 5/00* (2024.01)
*G06T 5/50* (2006.01)
(Continued)

(52) U.S. Cl.
CPC ............... *G06T 5/70* (2024.01); *G06T 5/50* (2013.01); *G06T 7/593* (2017.01); *G06T 2207/10012* (2013.01); *G06T 2207/10024* (2013.01); *G06T 2207/20182* (2013.01); *G06T 2207/20221* (2013.01)

(58) Field of Classification Search
CPC .. G06T 5/70; G06T 5/50; G06T 7/593; G06T 2207/10012; G06T 2207/10024; G06T 2207/20182; G06T 2207/20221; G06T 2207/10021; G06T 2207/20228; G06T 7/97
See application file for complete search history.

(56) References Cited

U.S. PATENT DOCUMENTS

| | | | |
|---|---|---|---|
| 5,867,591 A | 2/1999 | Onda | |
| 5,973,732 A | 10/1999 | Guthrie | |

(Continued)

FOREIGN PATENT DOCUMENTS

| | | | |
|---|---|---|---|
| CN | 110230983 A | 9/2019 | |
| CN | 111028155 A | 4/2020 | |

(Continued)

OTHER PUBLICATIONS

Puetter et al: "Digital Image Reconstruction", Annual Review of Astron. Astrophysics, Jun. 16, 2005, 58 pgs.
(Continued)

*Primary Examiner* — Mekonen T Bekele
(74) *Attorney, Agent, or Firm* — Gesmer Updegrove LLP

(57) ABSTRACT

Methods, systems, devices and computer software/program code products enable generating reduced-noise image frames based on image frames received from a digital camera pipeline; and enable efficient stereo image search between corresponding images generated by at least two cameras.

20 Claims, 14 Drawing Sheets

600. TEMPORAL DE-NOISING:

601. RECEIVE AT LEAST ONE FRAME OF IMAGE PIXEL DATA FROM A DIGITAL CAMERA PIPELINE

602. RECEIVE IMAGE METADATA CORRESPONDING TO THE AT LEAST ONE RECEIVED FRAME

603. EXECUTE TEMPORAL DE-NOISING OPERATIONS FOR AT LEAST SELECTED PIXELS OF THE AT LEAST ONE RECEIVED FRAME OF IMAGE PIXEL DATA:

603.1 EVALUATE A NOISE MODEL TO ESTIMATE THE NOISE PRESENT IN A SELECTED PIXEL FROM THE AT LEAST ONE RECEIVED FRAME;

603.2 BLEND DATA FROM A PERSISTENT IMAGE BUFFER WITH DATA FROM THE AT LEAST ONE RECEIVED FRAME;

603.3 UPDATE DATA IN THE PERSISTENT IMAGE BUFFER;

603.4 OUTPUT THE BLENDED PIXEL DATA TO A REDUCED-NOISE FRAME BUFFER, THEREBY TO GENERATE A REDUCED-NOISE IMAGE FRAME.

Related U.S. Application Data which is a continuation of application No. 16/749,989, filed on Jan. 22, 2020, now Pat. No. 11,106,275, which is a continuation of application No. 15/560,019, filed as application No. PCT/US2016/023433 on Mar. 21, 2016, now Pat. No. 10,551,913, application No. 17/588,335 is a continuation of application No. 16/768,870, filed as application No. PCT/US2018/063531 on Dec. 2, 2018, now Pat. No. 11,238,564, which is a continuation-in-part of application No. PCT/US2016/023433, filed on Mar. 21, 2016.

(60) Provisional application No. 62/593,920, filed on Dec. 2, 2017, provisional application No. 62/136,494, filed on Mar. 21, 2015.

(51) Int. Cl.
*G06T 5/70* (2024.01)
*G06T 7/593* (2017.01)

(56) References Cited

U.S. PATENT DOCUMENTS

| | | | |
|---|---|---|---|
| 5,991,464 | A | 11/1999 | Hsu et al. |
| 6,297,844 | B1 | 10/2001 | Shatz et al. |
| 6,751,340 | B2 | 6/2004 | Prokoski |
| 7,372,981 | B2 | 5/2008 | Lai et al. |
| 7,689,043 | B2 | 3/2010 | Austin et al. |
| 8,395,629 | B1 | 3/2013 | Kilpatrick et al. |
| 8,547,374 | B1 | 10/2013 | Sadjadi et al. |
| 9,047,504 | B1 | 6/2015 | Ramaswamy et al. |
| 9,280,821 | B1 | 3/2016 | Choe et al. |
| 9,298,974 | B1 | 3/2016 | Kuo et al. |
| 9,332,285 | B1 | 5/2016 | Grant et al. |
| 9,609,305 | B1 | 3/2017 | Ramaswamy |
| 10,154,243 | B2 | 12/2018 | He et al. |
| 10,509,821 | B2 | 12/2019 | Boncyk et al. |
| 11,238,564 | B2 * | 2/2022 | McCombe ............ H04N 23/683 |
| 2004/0027358 | A1 | 2/2004 | Nakao |
| 2004/0223630 | A1 | 11/2004 | Waupotitsch et al. |
| 2004/0240711 | A1 | 12/2004 | Hamza et al. |
| 2005/0063566 | A1 | 3/2005 | Beek et al. |
| 2005/0078866 | A1 | 4/2005 | Criminisi et al. |
| 2005/0129325 | A1 | 6/2005 | Wu |
| 2005/0185054 | A1 | 8/2005 | Edwards et al. |
| 2006/0056727 | A1 | 3/2006 | Jones et al. |
| 2006/0083421 | A1 | 4/2006 | Weiguo et al. |
| 2006/0152609 | A1 | 7/2006 | Prentice |
| 2006/0193179 | A1 | 8/2006 | England et al. |
| 2006/0193509 | A1 | 8/2006 | Criminisi et al. |
| 2007/0126921 | A1 | 6/2007 | Gallagher et al. |
| 2007/0167702 | A1 | 6/2007 | Hasser et al. |
| 2007/0183653 | A1 | 8/2007 | Medioni et al. |
| 2007/0254640 | A1 | 11/2007 | Bliss |
| 2008/0077596 | A1 | 3/2008 | Patton et al. |
| 2009/0116695 | A1 | 5/2009 | Anchyshkin et al. |
| 2009/0210491 | A1 | 8/2009 | Thakkar et al. |
| 2009/0278961 | A1 | 11/2009 | Mohanty et al. |
| 2010/0094800 | A1 | 4/2010 | Sharp |
| 2010/0103249 | A1 | 4/2010 | Lipton et al. |
| 2010/0158387 | A1 | 6/2010 | Choi et al. |
| 2010/0165155 | A1 | 7/2010 | Chang |
| 2010/0165206 | A1 * | 7/2010 | Nestares ................ G06T 5/70 348/607 |
| 2010/0238264 | A1 | 9/2010 | Liu et al. |
| 2011/0018903 | A1 | 1/2011 | Lapstun et al. |
| 2011/0064299 | A1 | 3/2011 | Zhang et al. |
| 2011/0075025 | A1 | 3/2011 | Cho et al. |
| 2011/0102440 | A1 | 5/2011 | Yuen et al. |
| 2011/0115921 | A1 | 5/2011 | Wang et al. |
| 2011/0187922 | A1 | 8/2011 | Hwang et al. |
| 2011/0292227 | A1 | 12/2011 | Nakazawa |
| 2011/0306422 | A1 | 12/2011 | Nishimoto et al. |
| 2012/0045091 | A1 | 2/2012 | Kaganovich |
| 2012/0069005 | A1 | 3/2012 | Seen et al. |
| 2012/0099005 | A1 | 4/2012 | Kali et al. |
| 2012/0106785 | A1 | 5/2012 | Karafin et al. |
| 2012/0121142 | A1 | 5/2012 | Nagesh |
| 2012/0133779 | A1 | 5/2012 | Ma et al. |
| 2012/0200669 | A1 | 8/2012 | Lai et al. |
| 2012/0209514 | A1 | 8/2012 | Chrysanthakopoulos |
| 2012/0249750 | A1 | 10/2012 | Izzat et al. |
| 2012/0262493 | A1 | 10/2012 | Tsai et al. |
| 2012/0262553 | A1 | 10/2012 | Chen et al. |
| 2012/0293608 | A1 | 11/2012 | Doepke et al. |
| 2013/0021490 | A1 | 1/2013 | James et al. |
| 2013/0070116 | A1 | 3/2013 | Suzuki et al. |
| 2013/0077880 | A1 | 3/2013 | Venkataraman et al. |
| 2013/0101160 | A1 | 4/2013 | Woodfill et al. |
| 2013/0169764 | A1 | 7/2013 | Lu et al. |
| 2013/0201301 | A1 | 8/2013 | Huang et al. |
| 2013/0215107 | A1 | 8/2013 | Kimura et al. |
| 2013/0258067 | A1 | 10/2013 | Zhang et al. |
| 2013/0278633 | A1 | 10/2013 | Ahn et al. |
| 2013/0287291 | A1 | 10/2013 | Cho |
| 2013/0293669 | A1 | 11/2013 | Lucey |
| 2013/0321564 | A1 | 12/2013 | Smith et al. |
| 2014/0038708 | A1 | 2/2014 | Davison et al. |
| 2014/0050372 | A1 | 2/2014 | Qi et al. |
| 2014/0071313 | A1 | 3/2014 | Hiasa |
| 2014/0200953 | A1 | 7/2014 | Mun |
| 2014/0219551 | A1 | 8/2014 | Tang |
| 2014/0226900 | A1 | 8/2014 | Saban et al. |
| 2014/0240587 | A1 | 8/2014 | Cote et al. |
| 2014/0267243 | A1 | 9/2014 | Venkataraman et al. |
| 2014/0270480 | A1 | 9/2014 | Boardman et al. |
| 2014/0337949 | A1 | 11/2014 | Hoyos |
| 2014/0341290 | A1 | 11/2014 | Merkle et al. |
| 2014/0375775 | A1 | 12/2014 | Yeatman, Jr. et al. |
| 2015/0049169 | A1 | 2/2015 | Krig et al. |
| 2015/0055821 | A1 | 2/2015 | Fotland |
| 2015/0066764 | A1 | 3/2015 | Crowell et al. |
| 2015/0098645 | A1 | 4/2015 | Leung |
| 2015/0110349 | A1 | 4/2015 | Feng et al. |
| 2015/0116317 | A1 | 4/2015 | Chen et al. |
| 2015/0229901 | A1 | 8/2015 | Doba et al. |
| 2015/0288856 | A1 | 10/2015 | Vanam et al. |
| 2015/0302592 | A1 | 10/2015 | Bruls et al. |
| 2015/0373316 | A1 | 12/2015 | Meng et al. |
| 2016/0005154 | A1 | 1/2016 | Meyers et al. |
| 2016/0037059 | A1 | 2/2016 | Lim et al. |
| 2016/0037060 | A1 | 2/2016 | Lim et al. |
| 2016/0042250 | A1 | 2/2016 | Cordova-Dida et al. |
| 2016/0065795 | A1 * | 3/2016 | Baqai ................ G06T 5/94 348/241 |
| 2016/0088278 | A1 | 3/2016 | Sadi et al. |
| 2016/0103900 | A1 | 4/2016 | Angelov et al. |
| 2016/0188995 | A1 | 6/2016 | Somanath et al. |
| 2016/0189387 | A1 | 6/2016 | Kannan et al. |
| 2016/0203579 | A1 | 7/2016 | Griffin et al. |
| 2016/0219267 | A1 | 7/2016 | Chu et al. |
| 2016/0295195 | A1 | 10/2016 | Thorn et al. |
| 2016/0337557 | A1 | 11/2016 | Kong et al. |
| 2016/0337628 | A1 * | 11/2016 | Kong ................ H04N 25/60 |
| 2016/0342832 | A1 | 11/2016 | Bud et al. |
| 2017/0017302 | A1 | 1/2017 | Libal et al. |
| 2017/0046025 | A1 | 2/2017 | Dascola et al. |
| 2017/0085733 | A1 | 3/2017 | Ilic et al. |
| 2017/0094243 | A1 | 3/2017 | Venkataraman et al. |
| 2017/0176532 | A1 | 6/2017 | Bhamidipati et al. |
| 2017/0244960 | A1 | 8/2017 | Ciurea et al. |
| 2018/0189550 | A1 | 7/2018 | McCombe et al. |
| 2018/0204307 | A1 | 7/2018 | Schied et al. |
| 2018/0307310 | A1 | 10/2018 | McCombe et al. |
| 2018/0315232 | A1 | 11/2018 | Jones et al. |
| 2018/0322623 | A1 | 11/2018 | Memo et al. |
| 2019/0304112 | A1 | 10/2019 | Hota et al. |
| 2020/0285309 | A1 | 9/2020 | McCombe et al. |
| 2020/0302682 | A1 | 9/2020 | Askoy et al. |
| 2020/0320777 | A1 | 10/2020 | Meshry et al. |
| 2020/0357128 | A1 | 11/2020 | McCombe et al. |
| 2021/0072822 | A1 | 3/2021 | Smith et al. |
| 2021/0192188 | A1 | 6/2021 | McCombe et al. |

(56) References Cited

U.S. PATENT DOCUMENTS

| | | |
|---|---|---|
| 2021/0217132 A1 | 7/2021 | McCombe et al. |
| 2021/0232215 A1 | 7/2021 | McCombe et al. |
| 2022/0091665 A1 | 3/2022 | McCombe et al. |
| 2022/0222842 A1 | 7/2022 | McCombe et al. |
| 2022/0337744 A1 | 10/2022 | McCombe et al. |
| 2023/0122149 A1 | 4/2023 | McCombe et al. |
| 2023/0152883 A1 | 5/2023 | McCombe et al. |

FOREIGN PATENT DOCUMENTS

| | | |
|---|---|---|
| EP | 1235439 A2 | 8/2002 |
| EP | 1418766 A2 | 5/2004 |
| EP | 3057317 A1 | 8/2016 |
| EP | 2847738 B1 | 7/2017 |
| GB | 2449738 A | 12/2008 |
| WO | 200054181 A1 | 9/2000 |
| WO | WO 2016/154123 | 9/2016 |
| WO | 2018146558 A2 | 8/2018 |
| WO | WO 2018/164852 | 9/2018 |

OTHER PUBLICATIONS

W. Mark et al., "Post-Rendering 3D Warping", Proc. of 1997 Sympos. on Interactive 3D Graphics, Apr. 1997, pp. 7-16 (10 pgs.).
Wikipedia Article "Shot Noise"; retrieved May 2023 from: "https://en.wikipedia.org/wiki/Shot_noise"; 5 pgs.
Wikipedia Article "Variable-gain Amplifier"; retrieved May 2023 from: "https://en.wikipedia.org/wiki/Variable-gain_amplifier"; 3 pgs.
Wikipedia Article "Bayer Filter"; retrieved May 2023 from: "https://en.wikipedia.org/wiki/Bayer_filter"; 9 pgs.
Avci et al., Efficient Disparity Vector Prediction Schemes, Jrnl. Of Visual Communication and Image Representation, Academic Press vol. 23, No. 2, Oct. 27, 2011, pp. 287-292.
Berge et al., Real-time Uncertainty Visualization for B-mode Ultrasound, 2015 IEEE Scientific Visualization Conf., Oct. 25, 2015, pp. 33-40.
Bhat D N et al., Stereo in the presence of specular reflection, Computer Vision, 1995, Proceedings, Fifth International Conference on Cambridge, MA, USA Jun. 20-23, Los Alamitos, CA, USA, IEEE, Comput. Soc. US, Jun. 20, 1995, pp. 1086-1092, XP010146946, DOI: 10.1109/ICCV.1995.466813, ISBN: 978-0-8186-7042-8.
Brown, Decentering Distortion of Lenses, Photogrammetric Engineering, 32 (3), 1966, pp. 444-462.
Carranza et al., Free-Viewpoint Video of Human Actors, ACM Transactions on Graphics, vol. 22, No. 3, pp. 569-577, Jul. 2003.
Choi et al., Implementation of Real-Time Post-Processing for High-Quality Stereo Vision, ETRI Journal, vol. 37, No. 4, Aug. 1, 2015, pp. 752-765.
Chu et al., OpenCV and TYZK: Video Surveillance for Tracking, Aug. 2008, Sandia Report SAND2008-5776.
Gordon et al., Person and Gesture Tracking with Smart Stereo Cameras, Proc. SPIE, vol. 6805, Jan. 2008.
Hannah, Computer Matching of Areas in Stereo Images, Jul. 1974 Thesis, Stanford University Computer Science Department Report STAN-CS-75-438.
Hoppe et al., Online Feedback for Structure-from-Motion Image Acquisition, Proceedings of the British Machine Vision Conference, Jan. 1, 2012, pp. 70.1-70.12, XP055123585, DOI: 10.5244/C.26.70, ISBN: 978-1-90-172546-9.
Hu et al., A region-based video de-noising algorithm based on temporal and spatial correlations, Neurocomputing 266 (2017), pp. 361-374.
Husken et al., Strategies and Benefits of Fusion of 2D and 3D Face Recognition, Proceedings / 2005 IEEE Computer Society Conference on Computer Vision and Pattern Recognition, CVPR 2005: Jun. 20-25, 2005, San Diego, CA, vol. 3, Jun. 20, 2005, pp. 174-174, XP055539324, Piscataway, NJ, USA, DOI: 10.1109/CVPR.2005.584, ISBN: 978-0-7695-2372-9.
Klein et al., Parallel Tracking and Mapping for Small AR Workspaces, 2007 IEEE ACM Internat. Sympos. On Mixed and Augmented Reality, Nov. 2007, 10 pages.
Luo et al., Hierarchical Genetic Disparity Estimation Algorithm for Multiview Image Synthesis, 2000 IEEE Int. conf. on Image Processing, vol. 2, pp. 768-771.
MacCormick, How Does the Kinect Work?, http://users.dickinson.edu/-jmac/selected-talks/kinect.pdf, Dec. 2011.
Melexis NV, MLX75023 Time-of-Flight Sensor Array, Product Datasheet, http://www.melexis.com/General/General/MLX75023-832.aspx, copyright 2016.
Newcombe et al., DTAM: Dense Tracking and Mapping in Real-Time, 2011 International Conf. on Computer Vision, Nov. 2011, 8 pages.
Olson, How a Stealth Startup Hopes to Change Video Calls and VR, published on website TheInformation.com, Jul. 7, 2021, https://www.theinformation.com/articles/how-a-stealth-startup-hopes-to-change-video-calls-and-vr, 3 pages.
OpenCV (Open Source Computer Vision library of programming functions), released Aug. 29, 2018, https://docs.opencv.org/3.4.3/.
Sakamoto et al., A multiple-baseline stereo for precise human face acquisition, In: Serious Games, Jan. 1, 1997, Springer International Publishing, Cham, XP055538389, ISSN: 0302-9743, ISBN: 978-3-642-15171-2, vol. 1206, pp. 419-428, DOI: 10.1007/BFb0016023.
Shin et al., Virtual Viewpoint Disparity Estimation and Convergence Check for Real-Time View Synthesis, Big Data Analytics in the Social and Ubiquitous Context: 5th International Workshop on Modeling Social Media, MSM 2014, 5TH International Workshop on Mining Ubiquitous and Social Environments, Muse 2014 And First International Workshop on Machine Le, XP019170124, ISBN: 978-3-642-17318-9, PSIVT 2011, Part 1, LNCS 7087, pp. 121-131, Springer-Verlag 2011.
Sluijter et al. Ray-Optics Analysis of Switchable Auto-Stereoscopic Lenticular-Based 2D / 3D Displays, Eindhoven Univ. of Tech., thesis project, Dec. 2005, pp i-iv and 1-78.
Spring et al., Olympus lifescience.com: Image Averaging and Noise Removal, May 14, 2017, URL: https://www.olympus-lifescience.com/en/microscope-resource/primer/jav/digitalim.
Tsung et al., Cache-Based Integer Motion-Disparity Estimation, 2009 IEEE Conf. on Acoustics, Speed and Signal Processing, Apr. 19, 2009, pp. 2013-2016.
Viola et al., Rapid Object Detection using a Boosted Cascade of Simple Features, Proc. Of 2001 IEEE Comput. Soc. Conf. on Comput, Vision and Pattern Recog., pp. 1-9.
Viola et al., Robust Real-time Face Detection, Proc. Of 8th IEEE International Conf. on Computer Vision, 2001, 1 page.
Wagner et al., Liveness Assurance in Face Authentication, In: Encyclopedia of Biometrics, Jan. 1, 2009, Springer US, Boston, MA, XP055296704, ISBN: 978-0-387-73003-5, pp. 908-916, DOI: 10.1007/978-0-387-73003-5_67.
Wikipedia Article, Simultaneous Localization & Mapping, retrieved Apr. 2023 from https://en.wikipedia.org/wiki/Simultaneous_localization_and_mapping, 10 pages.
Wikipedia Article, Viola-Jones Object Detection Framework, retrieved Apr. 2023 from https://en.wikipedia.org/w/index.php?title=Viola-Jones_object_detection_framework, 7 pages.
wikipedia.org, article re: OpenCV, last edited Aug. 29, 2018; https://en.wikipedia.org/wiki/OpenCV.
wikipedia.org, Article re: Time-of-Flight Camera, http://en.wikipedia.org/wiki/Time-of-flight_camera, last edited Jun. 21, 2019.
Zabih et al., Non-parametric Local Transforms for Computing Visual Correspondence, Proc. European Conf. on Computer Vision, May 1994, pp. 151-158.
Zhang et al., A saliency based noise reduction method for Digital TV, Consumer Electronics (ICCE), 2011 IEEE International Conference on, IEEE, Jan. 9, 2011, pp. 743-744, XP031921487, DOI: 10.1109/ICCE.2011.5722840, ISBN; 978-1-4244-8711-0.
Zhu et al., Pre-Processing of X-Ray Medical Image Based on Improved Temporal Recursive Self-Adaptive Filter, Young Computer Scientists, 2008, ICYCS 2008, The 9th International Confer-

(56) References Cited

OTHER PUBLICATIONS ence for, IEEE, Piscataway, NJ, USA, Nov. 18, 2008, pp. 758-763, XP031373266, ISBN: 978-0-7695-3398-8.

* cited by examiner

FIG. 4

```
Public Function NoiseModel(Luminance_ADU8 As Single, BlackLevel_ADU8 As
Single, GainFactor As Single) As Single
    ' sensor electron well capacity = 8960 electrons
    ' compute the number of electrons represented by one incremental
value of a 16 bit number
    e_per_adu16 = (8960#) / 65536#

' compute the number of electrons represented by one incremental
value of an 8 bit number
    e_per_adu8 = e_per_adu16 * 256#

' approximate the sensor read noise with a constant number of
electrons in the model
    read_noise_e = 10.32

' the sigma to apply to the estimated shot noise
    shot_noise_sigma = 2#

' the number of prior samples factored into the measured luminance.
In this case, simply 1 as the model is applied to a single frame
    sample_count = 1#

' apply the black level and invert the sensor gain function to
estimate the number of electrons in the sensing element's electron well
    luminance_minus_blacklevel = Max(0, Luminance_ADU8 -
BlackLevel_ADU8)
    combined_gain = GainFactor * DecibelsToLinearFactor(11#)   ' 11dB of
fixed gain in the sensor
    avg_e = (luminance_minus_blacklevel * e_per_adu8) / combined_gain   '
average number of electrons in the sensor well ' estimate the number of the electrons due to shot noise and read
noise
    shot_noise_e = Sqr(Max(0, avg_e - read_noise_e)) * shot_noise_sigma
' shot noise in electrons
    total_noise_e = shot_noise_e + read_noise_e   ' add read noise
constant to get total noise ' divide by square root of sample_count to estimate noise with
multiple samples
    total_noise_e = total_noise_e / Sqr(sample_count)

' convert the noise estimate from an electron count back to a value
expressed in an 8bit number
    total_noise_adu8 = (total_noise_e / e_per_adu8) * combined_gain
    NoiseModel = total_noise_adu8
End Function
```

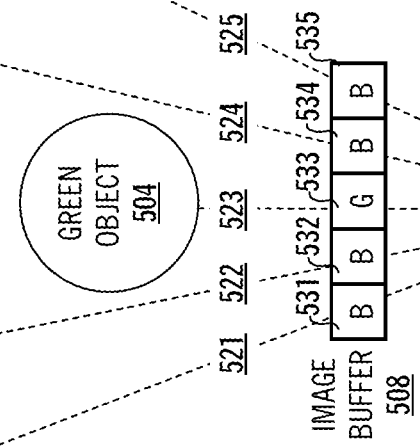
FIG. 5

600. TEMPORAL DE-NOISING:

601. RECEIVE AT LEAST ONE FRAME OF IMAGE PIXEL DATA FROM A DIGITAL CAMERA PIPELINE

602. RECEIVE IMAGE METADATA CORRESPONDING TO THE AT LEAST ONE RECEIVED FRAME

603. EXECUTE TEMPORAL DE-NOISING OPERATIONS FOR AT LEAST SELECTED PIXELS OF THE AT LEAST ONE RECEIVED FRAME OF IMAGE PIXEL DATA:

603.1 EVALUATE A NOISE MODEL TO ESTIMATE THE NOISE PRESENT IN A SELECTED PIXEL FROM THE AT LEAST ONE RECEIVED FRAME;

603.2 BLEND DATA FROM A PERSISTENT IMAGE BUFFER WITH DATA FROM THE AT LEAST ONE RECEIVED FRAME;

603.3 UPDATE DATA IN THE PERSISTENT IMAGE BUFFER;

603.4 OUTPUT THE BLENDED PIXEL DATA TO A REDUCED-NOISE FRAME BUFFER, THEREBY TO GENERATE A REDUCED-NOISE IMAGE FRAME.

FIG. 6

700. NOISE MODEL:

(701. NOISE MODEL COMPRISES A SIMULATION OF THE INVERSE BEHAVIOR OF AT LEAST SELECTED ASPECTS OF THE DIGITAL CAMERA PIPELINE.)

(702. NOISE MODEL COMPRISES A SIMULATION OF THE INVERSE OF THE BEHAVIOR OF A VARIABLE GAIN AMPLIFIER.)

(703. NOISE MODEL COMPRISES A SIMULATION OF THE INVERSE OF THE BEHAVIOR OF AUTOMATIC WHITE-BALANCE LOGIC.)

(704. NOISE MODEL COMPRISES A SIMULATION OF THE INVERSE OF THE BEHAVIOR OF AUTOMATIC EXPOSURE CONTROL.)

(705. NOISE MODEL COMPRISES A SIMULATION OF THE NUMBER OF ELECTRONS IN AN ELECTRON WELL ASSOCIATED WITH A LIGHT SENSING ELEMENT OF THE DIGITAL CAMERA PIPELINE.)

(706. EVALUATING A NOISE MODEL COMPRISES INTERPOLATING BETWEEN COEFFICIENTS IN A LOOKUP TABLE.)

(707. NOISE MODEL IS EVALUATED IN A MANNER DEPENDENT ON THE COLOR REPRESENTED BY IMAGE PIXEL DATA.)

(708. AT LEAST ONE LOOKUP TABLE IS GENERATED IN RESPONSE TO META-DATA ASSOCIATED WITH AT LEAST ONE RECEIVED FRAME.)

(709. UTILIZE INFORMATION FROM THE NOISE MODEL TO EVALUATE PIXEL DATA TO QUANTIFY THE LIKELIHOOD THAT A MEASURED VARIATION IN THE PIXEL DATA IS DUE TO NOISE RATHER THAN A CHANGE IN OBSERVED SITUATION)

(710. APPLY AN OUTPUT FROM THE NOISE MODEL TO A VIDEO SIGNAL, TO IMPROVE SUITABILITY OF THE SIGNAL AS AN INPUT TO A STEREO DISPARITY SEARCH OPERATION)

(711. NOISE MODEL IS A SOURCE FOR BLENDING INFORMATION USEABLE IN EXECUTING BLENDING)

FIG. 7

800. PERSISTENT IMAGE BUFFER:

(801. PERSISTENT IMAGE BUFFER COMPRISES A SUMMATION OF DATA FROM PRIOR FRAMES.)

(802. PERSISTENT IMAGE BUFFER COMPRISES AN AVERAGE OF DATA FROM PRIOR FRAMES.)

(803. AT LEAST ONE PIXEL IN PERSISTENT IMAGE BUFFER IS INVALIDATED IN RESPONSE TO SELECTED RESULT OF EVALUATION OF NOISE MODEL.)

(804. AT LEAST ONE PIXEL IN PERSISTENT IMAGE BUFFER IS INVALIDATED IN RESPONSE TO A SELECTED RESULT OF A COMPARISON WITH A PIXEL FROM THE AT LEAST ONE RECEIVED FRAME.)

(805.1. THE PERSISTENT IMAGE BUFFER CAN ALIGN WITH A CAMERA FRAME BUFFER, SUCH THAT THERE EXISTS A SUBSTANTIALLY ONE-TO-ONE CORRESPONDENCE BETWEEN A GIVEN FRAME BUFFER PIXEL AND AN ELEMENT IN THE PERSISTENT IMAGE BUFFER, WHEN EACH IS ADDRESSED IN THE SAME COORDINATE SPACE)

(805.2 THE PERSISTENT IMAGE BUFFER CAN ALIGN WITH A POST-TRANSFORMED IMAGE BUFFER, SUCH THAT A SELECTED TRANSFORM RELATES A GIVEN FRAME BUFFER PIXEL AND AN ELEMENT IN THE PERSISTENT IMAGE BUFFER)

(805.2.1 THE TRANSFORM IS A RECTIFICATION OPERATION)

(805.2.2 THE TRANSFORM COMPRISES ANY OF PIXEL STRETCH OR BLENDING OPERATIONS, RE-PROJECTION, CORRECTION FOR LENS EFFECTS, OR TRANSFORMATION ENABLING THE PERSISTENT IMAGE BUFFER TO REPRESENT DATA IN A FORMAT DIFFERENT FROM THE DATA FORMAT OF THE FRAME BUFFER)

(805.2.3 THE TRANSFORM CAN BE CHANGED ON A FRAME-BY-FRAME BASIS)

(805.3 THE PERSISTENT IMAGE BUFFER CAN BE AN ABSTRACT DATA STRUCTURE, AND CORRESPONDENCE BETWEEN A GIVEN FRAME BUFFER PIXEL AND AN ELEMENT IN THE PERSISTENT IMAGE BUFFER IS OF ARBITRARY COMPLEXITY)

(805.3.1 CORRESPONDENCE BETWEEN A GIVEN FRAME BUFFER PIXEL AND AN ELEMENT IN THE PERSISTENT IMAGE BUFFER COMPRISES A LOOKUP OPERATION INTO A DATA STRUCTURE)

(805.3.2 THE LOOKUP OPERATION COMPRISES AT LEAST ONE LEVEL OF INDIRECTION)

FIG. 8

900. RE-PROJECTION:

(901. PERSISTENT IMAGE BUFFER IS RE-PROJECTED IN RESPONSE TO CAMERA MOVEMENT.)

(902. RE-PROJECTION IS A SELECTED IMAGE WARP IN RESPONSE TO CAMERA ROTATION.)

(903. RE-PROJECTION UTILIZES A DEPTH BUFFER.)

(904. THE RE-PROJECTING UTILIZES PIXEL DEPTH VALUES TO INCREASE ACCURACY OF RE-PROJECTION)

(904.1. PIXEL DEPTH VALUE IS ESTIMATED FROM STEREO DISPARITY INFORMATION)

(904.2. PIXEL DEPTH VALUE IS ESTIMATED FROM INFORMATION DERIVED FROM ANY OF A DEPTH SENSOR, TIME-OF-FLIGHT SENSOR, OR STRUCTURED-LIGHT BASED DEPTH SENSOR)

(905. THE RE-PROJECTING UTILIZES CAMERA TRANSFORMATION INFORMATION GENERATED BY ADDITIONAL SENSORS)

(905.1. THE ADDITIONAL SENSORS COMPRISE ANY OF AT LEAST ONE ACCELEROMETER, GYROSCOPE, OR ADDITIONAL CAMERA OR SET OF CAMERAS)

(906. THE RE-PROJECTING UTILIZES CAMERA TRANSFORMATION INFORMATION GENERATED BY A PROCESS THAT INTERPRETS DATA FROM THE SAME CAMERA OR CAMERAS THAT CAPTURE IMAGE DATA, TO GENERATE CAMERA TRANSFORMATION INFORMATION)

(906.1. THE PROCESS THAT INTERPRETS DATA COMPRISES ANY OF SIMULTANEOUS LOCATION AND MAPPING (SLAM), PARALLEL TRACKING AND MAPPING (PTAM), OR DENSE TRACKING AND MAPPING (DTAM))

(907. (a) THE RE-PROJECTING UTILIZES CAMERA TRANSFORMATION INFORMATION RESULTING FROM A STEREO DISPARITY SEARCH EXECUTED ON DE-NOISED OUTPUT DATA; (b) THE CAMERA TRANSFORMATION INFORMATION RESULTS FROM EVALUATION ACROSS A CAPTURED FRAME; AND (c) THE CAMERA TRANSFORMATION INFORMATION IS UTILIZED TO RE-PROJECT THE PERSISTENT IMAGE BUFFER STORED PRIOR TO CAMERA MOVEMENT )

FIG. 9

1000. STEREO SEARCH WITH DE-NOISING:

1001. UTILIZE AT LEAST TWO TEMPORAL DE-NOISING PIPELINES OPERABLE ACCORDING TO THE DE-NOISING METHODS DESCRIBED HEREIN (SEE, E.G., FIG. 6), EACH DE-NOISING PIPELINE BEING OPERABLE TO RECEIVE IMAGE FRAMES FROM A RESPECTIVE CAMERA.

(1001.1 TEMPORAL DE-NOISING PIPELINES COMPRISE PROCESSING MODULES; THE PROCESSING MODULES COMPRISING SOFTWARE MODULES EXECUTING ON COMPUTATIONAL RESOURCES.)

(1001.2 SOFTWARE MODULES EXECUTE ON SHARED COMPUTATIONAL RESOURCES.)

(1001.3 TEMPORAL DE-NOISING PIPELINES COMPRISE DEDICATED ELECTRONIC COMPONENTS.)

(1001.4 AT LEAST TWO CAMERAS PARTICIPATE IN A SHUTTER SYNCHRONIZATION PROTOCOL.)

1002. UTILIZE AT LEAST ONE DIGITAL MEMORY ELEMENT TO RECEIVE OUTPUT IMAGES FROM THE RESPECTIVE DE-NOISING PIPELINES

1003. UTILIZE A STEREO CORRESPONDENCE SEARCH MODULE TO COMPARE AN OUTPUT IMAGE FROM A FIRST TEMPORAL DE-NOISING PIPELINE WITH A TENTATIVELY CORRESPONDING OUTPUT IMAGE FROM ANOTHER TEMPORAL DE-NOISING PIPELINE.

FIG. 10

1100. IMAGE META-DATA, OTHER DATA:

(1101. BUFFER DATA CAN COMPRISE RAW CAPTURED PIXEL INFORMATION)

(1102.1. IMAGE METADATA CAN COMPRISE EXPOSURE INFORMATION FROM AN AUTO-EXPOSURE ELEMENT)

(1102.2. IMAGE METADATA CAN COMPRISE WHITE-BALANCE INFORMATION FROM AN AUTOMATIC WHITE-BALANCE ELEMENT)

(1102.3. IMAGE METADATA CAN COMPRISE ANY OF BLACK LEVEL INFORMATION, VARIABLE GAIN AMPLIFICATION INFORMATION, OR EXPOSURE TIME INFORMATION)

(1102.4. IMAGE METADATA CAN COMPRISE INFORMATION GENERATED BY A DIGITAL CAMERA PIPELINE)

(1102.5. IMAGE METADATA CAN COMPRISE INFORMATION DESCRIBING OBSERVATIONS MADE BY SENSORS)

(1102.5.1. THE SENSORS CAN COMPRISE AT LEAST ONE CAMERA)

(1102.6. IMAGE METADATA CAN COMPRISE INFORMATION DESCRIBING THE MAGNITUDE OR PRESENCE OF ACTIONS EXECUTED BY AN IMAGING PIPELINE.)

FIG. 11

1200. OTHER ACTIONS/PROCESSES:

(1201. UTILIZE A PERSISTENT DATA STORE TO RETAIN INFORMATION REPRESENTING THE NUMBER OF VALID SAMPLES)

(1202. UTILIZE THE PERSISTENT DATA STORE TO RETAIN INFORMATION ESTIMATING THE NUMBER OF ELECTRONS OR PHOTONS THAT HAVE BEEN INTEGRATED INTO CORRESPONDING DATA)

(1203. IMAGING PIPELINE CAN EXECUTE A FILTER OPERATION)

(1204. UTILIZE A CUMULATIVE AVERAGE, IN WHICH FOR A GIVEN PIXEL IN A CAPTURED FRAME, A CAPTURED PIXEL VALUE IS ADDED TO A PERSISTENT PIXEL VALUE, AND AN EFFECTIVE SAMPLE COUNT FOR THE PERSISTENT PIXEL IS INCREMENTED, AND WHEREIN A PIXEL VALUE FOR A DE-NOISED FRAME IS PRODUCED BY DIVIDING THE SUM OF PIXEL VALUES IN THE PERSISTENT PIXEL BY THE ASSOCIATED EFFECTIVE SAMPLE COUNT FOR THAT PIXEL)

(1205. PROVIDE PERSISTENT TRACKING OF THE STATISTICAL DEVIATION FOR EACH PIXEL VALUE FROM ONE CAPTURED FRAME TO A NEXT CAPTURED FRAME)

(1206. UTILIZE A RUNNING AVERAGE, WHEREIN THE STANDARD DEVIATION FOR A GIVEN PIXEL IS UTILIZED TO DETERMINE A WEIGHT TO ASSIGN TO A NEWLY CAPTURED PIXEL VALUE, AND A WEIGHT TO ASSIGN TO PREVIOUSLY CAPTURED PIXEL VALUES, TO ENABLE BLENDING THE CAPTURED PIXEL VALUE AND A PERSISTENT PIXEL VALUE IN ACCORDANCE WITH THE WEIGHTS, TO CREATE A DE-NOISED OUTPUT PIXEL VALUE)

(1207. DATA CORRESPONDING TO A CAPTURED PIXEL IS BLENDED WITH DATA FROM A CORRESPONDING PERSISTENT PIXEL IN ACCORDANCE WITH A BLENDING RATIO, WHEREIN THE BLENDING RATIO IS INFLUENCED BY METADATA FROM A CORRESPONDING CAPTURED FRAME)

(1208. METADATA FROM A CORRESPONDING CAPTURED FRAME COMPRISES AMPLIFICATION INFORMATION)

(1209. DATA FROM A GIVEN PIXEL IS NORMALIZED WITH RESPECT TO METADATA VALUES FROM A CORRESPONDING CAPTURED FRAME, PRIOR TO BLENDING)

(1210. EXECUTE A COMPRESSION OPERATION ON DATA FROM A PERSISTENT IMAGE BUFFER)

(1210.1. THE COMPRESSION IS LOSSLESS)

(1210.2. THE COMPRESSION IS LOSSY)

(1210.3 COMPRESSION OPERATION EXECUTED IN ACCORDANCE WITH A SELECTED COMPRESSION SCHEME)

(1210.3.1 SELECTED COMPRESSION SCHEME BASED AT LEAST IN PART ON AN OBSERVATION THAT SPATIALLY PROXIMATE PIXELS OFTEN HAVE SIMILAR VALUES)

FIG. 12A

1200. OTHER ACTIONS/PROCESSES (CONTINUED FROM 12A):

(1211. CONSTRUCT LOOKUP TABLE THAT CAN BE USED FOR ALL, OR SUBSTANTIALLY ALL, PIXEL VALUES IN A GIVEN FRAME)

(1212. EXECUTE DE-NOISING OPERATIONS UTILIZING COMPUTATIONAL RESOURCES WITHIN THE DIGITAL CAMERA PIPELINE)

(1213. COMPUTATIONAL RESOURCES WITHIN THE DIGITAL CAMERA PIPELINE COMPRISE DEDICATED HARDWARE ELEMENTS)

(1214. UTILIZE ANALOG INFORMATION DIRECTLY GENERATED BY DIGITAL CAMERA PIPELINE)

(1215. FOR A GIVEN PIXEL, INTERPRET EACH COLOR COMPONENT VALUE INDEPENDENTLY OF OTHER COLOR COMPONENT VALUES)

(1216. ESTIMATE NOISE IN ONE COLOR CHANNEL OF A GIVEN PIXEL WITHOUT REGARD TO VALUES OF OTHER COLOR CHANNELS FOR THE GIVEN PIXEL)

(1217. CONSTRUCT STATISTICAL NOISE MODEL HAVING DIFFERENT PARAMETERS FOR DIFFERENT COLOR CHANNELS, TO ACCOUNT FOR DIFFERENCES IN SENSITIVITY BETWEEN DIFFERENT COLOR CHANNELS OF A GIVEN DIGITAL CAMERA)

(1217.1. THE DIFFERENT PARAMETERS FOR DIFFERENT COLOR CHANNELS COMPRISE A DIFFERENT ELECTRON WELL CAPACITY FOR A GIVEN COLOR CHANNEL)

(1217.2. THE DIFFERENT PARAMETERS FOR DIFFERENT COLOR CHANNELS COMPRISE: ALLOCATING ADDITIONAL SAMPLING TO A GIVEN COLOR CHANNEL)

(1217.3. THE DIFFERENT PARAMETERS FOR DIFFERENT COLOR CHANNELS COMPRISE: EXECUTING A SELECTED TRANSFORMATION OR ADJUSTMENT DIFFERENTLY FOR A GIVEN COLOR CHANNEL)

(1218. FOR A GIVEN PIXEL, UTILIZE COMBINED PIXEL VALUE ENCODING COMPOUND COLOR VALUE)

(1219. FOR A GIVEN PIXEL, UTILIZE AN INDEPENDENT-COLOR COLOR SPACE AND REDUCE PIXEL VALUE TO A SCALAR QUANTITY)

(1219.1. THE INDEPENDENT-COLOR COLOR SPACE IS AN RGB COLOR SPACE)

(1219.2.1. REDUCING PIXEL VALUE TO A SCALAR QUANTITY IS EXECUTED BY CALCULATING THE MAGNITUDE OF THE CORRESPONDING 3-DIMENSIONAL COLOR VECTOR USING THE PYTHAGOREAN THEOREM)

(1219.2.2. REDUCE PIXEL VALUE TO A SCALAR QUANTITY IS EXECUTED BY UTILIZING ONLY THE VALUE OF THE LARGEST COMPONENT OF THE CORRESPONDING COLOR VECTOR)

(1219.2.2.1. APPROXIMATE A COLOR VECTOR MAGNITUDE)

(1220. UTILIZE A COMBINED-COLOR COLOR SPACE AND EXECUTING NOISE ESTIMATION UTILIZING THE LUMINANCE CHANNEL ALONE)

(1220.1 THE COMBINED-COLOR COLOR SPACE IS A YUV COLOR SPACE)

FIG. 12B

TEMPORAL DE-NOISING

CROSS-REFERENCE TO RELATED APPLICATIONS, INCORPORATION BY REFERENCE

This patent application is a Continuation of commonly owned U.S. patent application Ser. No. 16/768,870 filed 1 Jun. 2020, which is a national phase entry (35 USC 371) of commonly owned PCT App. PCT/US18/63531 filed 2 Dec. 2018, which claims the priority benefit of commonly owned U.S. Provisional Pat. App. 62/593,920 filed Dec. 2, 2017, entitled "Temporal De-Noising"; and is a continuation-in-part of commonly owned, co-pending PCT patent application PCT/US16/23433 filed 21 Mar. 2016, entitled "Virtual 3D Methods, Systems And Software", published as WO/2016/154123; which claims the priority benefit of U.S. Provisional Pat. App. 62/136,494 filed Mar. 21, 2015; each being incorporated by reference herein as if set forth herein in its entirety.

This patent application is also related to commonly owned, co-pending PCT patent application PCT/US16/32213 entitled "Facial Signature Methods, Systems and Software", published as WO/2016/183380, which claims the priority benefit of U.S. Provisional Pat. App. 62/160,563 filed 12 May 2015.

This patent application is also related to commonly owned, co-pending PCT patent application PCT/US18/19243 entitled "Image Reconstruction for Virtual 3D", published as WO/2018/164852, which claims the priority benefit of U.S. Provisional Pat. App. 62/462,307 filed Feb. 22, 2017.

This patent application is also related to commonly owned, co-pending PCT patent application PCT/US18/48197, entitled "Visual Communications Methods, Systems And Software", which claims the priority benefit of U.S. Provisional Pat. App. 62/550,685 filed Aug. 27, 2017.

This application is also related to commonly owned U.S. Provisional Pat. Apps. 62/594,006 and 62/595,055, respectively.

Each of the above-listed patent applications is incorporated by reference herein as if set forth herein in its entirety, including all text and drawings thereof. Also incorporated by reference herein are the following:
"Post-Rendering 3D Warping", Bill Mark, et. al 1997;
https://en.wikipedia.org/wiki/Shot_noise;
https://en.wikipedia.org/wiki/Variable-gain_amplifier;
https://en.wikipedia.org/wiki/Bayer_filter.

BACKGROUND OF THE INVENTION

It would be desirable to provide methods, systems, devices and computer software/program code products that can produce reduced-noise ("de-noised") images or signals based on image data captured by a camera or other sensor, and based on a computational/statistical model of the sensor.

It would also be desirable to provide such functions at reasonable computational cost.

The present invention provides methods, systems, devices and computer software/program code products that enable the foregoing aspects and others.

Although embodiments and practices of the present invention discussed herein can be used in conjunction with practices and embodiments of the Virtual 3-D ("V3D") inventions described in the above-listed, commonly-owned patent applications incorporated herein by reference, they can also be useful in other systems and in connection with other technologies, including in otherwise conventional camera/imaging pipelines, and are not limited to application in connection with the V3D inventions described in the patent applications incorporated by reference herein.

Aspects, examples, embodiments and practices of the invention, whether in the form of methods, devices, systems or computer software/program code products, will next be described in greater detail in the following Detailed Description of the Invention, in conjunction with the attached drawing figures.

Those skilled in the art will appreciate that while the following detailed description provides sufficient detail to enable one skilled in the art to practice the present invention, the various examples, embodiments and practices of the present invention that are discussed and described below, in conjunction with the attached drawing figures, are provided by way of example, and not by way of limitation. Numerous variations, additions, and other modifications or different implementations of the present invention are possible, and are within the spirit and scope of the invention.

SUMMARY OF THE INVENTION

The present invention provides methods, systems, devices, and computer software/program code products suitable for a wide range of applications, including, but not limited to: facilitating video communications and presentation of image and video content in telecommunications applications; and facilitating video communications and presentation of image and video content for virtual reality (VR), augmented reality (AR) and head-mounted display (HMD) systems.

Methods, systems, devices, and computer software/program code products in accordance with the invention are suitable for implementation or execution in, or in conjunction with, commercially available computer graphics processor configurations and systems including one or more display screens for displaying images, cameras for capturing images, and graphics processors for rendering images for storage or for display, such as on a display semen, and for processing data values for pixels in an image representation. The cameras, graphics processors and display screens can be of a form provided in commercially available smartphones, tablets and other mobile telecommunications devices, as well as in commercially available laptop and desktop computers, which may communicate using commercially available network architectures including client/server and client/network/cloud architectures.

In the aspects of the invention described below and hereinafter, the algorithmic image processing methods described are executable by digital processors, which can include graphics processor units, including GPGPUs such as those commercially available on cellphones, smartphones, tablets and other commercially available telecommunications and computing devices, as well as in digital display devices and digital cameras. Those skilled in the art to which this invention pertains will understand the structure and operation of digital processors, GPGPUs and similar digital graphics processor units.

One aspect of the present invention relates to methods, systems and computer software/program code products for generating reduced-noise image frames based on image frames received from a digital camera pipeline, and includes executing the following, in a digital processing resource comprising at least one digital processor:

A. receiving at least one frame of image pixel data from a digital camera pipeline;

B. receiving image metadata corresponding to the at least one received frame; and C. executing temporal de-noising operations for at least selected pixels of the at least one received frame of image pixel data, wherein executing temporal de-noising operations comprises:
  (1) evaluating a noise model to estimate the noise present in a selected pixel from the at least one received frame;
  (2) blending data from a persistent image buffer with data from the at least one received frame;
  (3) updating data in the persistent image buffer; and
  (4) outputting the blended pixel data to a reduced-noise frame buffer, thereby to generate a reduced-noise image frame.

In another aspect of the invention, the persistent image buffer aligns with a camera frame buffer, such that there exists a substantially one-to-one correspondence between a given frame buffer pixel and an element in the persistent image buffer, when each is addressed in the same coordinate space.

In another aspect of the invention, the persistent image buffer aligns with a post-transformed image buffer, such that a selected transform relates a given frame buffer pixel and an element in the persistent image buffer.

In another aspect of the invention, the transform is a rectification operation.

In another aspect of the invention, the transform comprises any of pixel stretch or blending operations, re-projection correction for lens effects, or transformation enabling the persistent image buffer to represent data in a format different from the data format of the frame buffer.

In another aspect of the invention, the transform can be changed on a frame-by-frame basis.

In another aspect of the invention, the persistent image buffer is an abstract data structure, and wherein correspondence between a given frame buffer pixel and an element in the persistent image buffer is of arbitrary complexity.

In another aspect of the invention, correspondence between a given frame buffer pixel and an element in the persistent image buffer comprises a lookup operation into a data structure.

In another aspect of the invention, the lookup operation comprises at least one level of indirection.

In another aspect of the invention, the noise model comprises a simulation of the inverse behavior of at least selected aspects of the digital camera pipeline.

In another aspect of the invention, the noise model comprises a simulation of the inverse of the behavior of a variable gain amplifier.

In another aspect of the invention, the noise model comprises a simulation of the inverse of the behavior of automatic white-balance logic.

In another aspect of the invention, the noise model comprises a simulation of the inverse of the behavior of automatic exposure control.

In another aspect of the invention, the noise model comprises a simulation of the number of electrons in an electron well associated with a light sensing element of the digital camera pipeline.

In another aspect of the invention, evaluating a noise model comprises interpolating between coefficients in a lookup table.

In another aspect of the invention, at least one lookup table is generated in response to metadata associated with at least one received frame.

In another aspect of the invention, the noise model is evaluated in a manner dependent on the color represented by image pixel data.

In another aspect of the invention, the persistent image buffer comprises a summation of data from prior frames.

In another aspect of the invention, the persistent image buffer comprises an average of data from prior frames.

In another aspect of the invention, at least one pixel in the persistent image buffer is invalidated in response to a selected result of the evaluation of the noise model.

In another aspect of the invention, at least one pixel in the persistent image buffer is invalidated in response to a selected result of a comparison with a pixel from the at least one received frame.

In another aspect of the invention, the persistent image buffer is re-projected in response to camera movement.

In another aspect of the invention, the re-projection is a selected image warp in response to camera rotation.

In another aspect of the invention, the re-projection utilizes a depth buffer.

Another aspect of the invention relates to methods, systems and computer software/program code products for executing stereo image search between corresponding images generated by at least two cameras.

In one such aspect, a system according to the invention for executing stereo image search between corresponding images generated by at least two cameras comprises:
  A. at least two temporal de-noising pipelines, each operable according to one or more of the temporal de-noising methods of the invention described herein, each de-noising pipeline being operable to receive image frames from a respective camera;
  B. at least one digital memory element, the memory element being operable to receive output images from the respective de-noising pipelines; and
  C. a stereo correspondence search module, the stereo correspondence search module being operable to compare an output image from a first temporal de-noising pipeline with a tentatively corresponding output image from another temporal de-noising pipeline.

See the Applicants' commonly owned patent applications listed above and incorporated herein by reference, for stereo correspondence search methods, systems and modules that can be employed in conjunction with the present de-noising invention.

In another aspect of the invention, the temporal de-noising pipelines comprise processing modules; the processing modules comprising software modules executing on computational resources.

In another aspect of the invention, the software modules execute on shared computational resources.

In another aspect of the invention, the temporal de-noising pipelines comprise dedicated electronic components.

In another aspect of the invention, at least two cameras participate in a shutter synchronization protocol.

Another aspect of the invention relates to systems for generating reduced-noise imago frames based on image frames received from a digital camera pipeline, such systems comprising:
  a digital processing resource comprising at least one digital processor, the digital processing resource being operable to:
  A. receive at least one frame of image pixel data from a digital camera pipeline;
  B. receive image metadata corresponding to the at least one received frame; and C. execute temporal de-noising operations for at least selected pixels of the at least one received frame of image pixel data; wherein executing; temporal de-noising operations comprises:
(1) evaluating a noise model to estimate the noise present in a selected pixel from the at least one received frame;
(2) blending data from a persistent image buffer with data from the at least one received frame;
(3) updating data in the persistent image buffer; and
(4) outputting the blended pixel data to a reduced-noise frame buffer, thereby to generate a reduced-noise image frame.

Another aspect of the invention relates to a computer software/program products for use with a digital processing system to enable the digital processing system to generate reduced-noise image frames based on image frames received from a digital camera pipeline, the digital processing system comprising a digital processing resource, the digital processing resource comprising at least one digital processor, the program product comprising digital processor-executable program instructions stored on a non-transitory digital processor-readable medium, which when executed in the digital processing resource cause the digital processing resource to:
A. receive at least one frame of image pixel data from a digital camera pipeline;
B. receive image metadata corresponding to the at least one received frame; and
C. execute temporal de-noising operations for at least selected pixels of the at least one received frame of image pixel data; wherein executing temporal de-noising operations comprises:
(1) evaluating a noise model to estimate the noise present in a selected pixel from the at least one received frame;
(2) blending data from a persistent image butler with data from the at least one received frame;
(3) updating data in the persistent image buffer; and
(4) outputting the blended pixel data to a reduced-noise frame buffer, thereby to generate a reduced-noise image frame.

Another aspect of the invention relates to methods for executing stereo image search between corresponding images generated by at least two cameras, comprising:
A. utilizing at least two de-noising pipelines, each operable according to one or more of the temporal de-noising methods of the invention described herein, each operable to receive image frames from a respective camera;
B. utilizing at least one digital memory element to receive output images from the respective de-noising pipelines; and
C. utilizing a stereo correspondence module to compare an output image from a first temporal de-noising pipeline with a tentatively corresponding output image from another temporal de-noising pipeline.

Another aspect of the invention relates to a program product for use with a digital processing system to enable the digital processing system to execute stereo image search between corresponding images generated by at least two cameras, the digital processing system comprising a digital processing resource, the digital processing resource comprising at least one digital processor, the program product comprising digital processor-executable program instructions stored on a non-transitory digital processor-readable medium, which when executed in the digital processing resource cause the digital processing resource to:

A. utilize at least two temporal de-noising pipelines, each operable according to one or more of the temporal de-noising methods of the invention described herein, to receive image frames from a respective camera;
B. utilize at least one digital memory element receive output images from the respective de-noising pipelines; and
C. utilize a stereo correspondence search module to compare an output image from a first temporal de-noising pipeline with a tentatively corresponding output image from another temporal de-noising pipeline.

Another aspect of the invention further comprises: utilizing a persistent data store to retain information representing the number of valid samples.

Another aspect of the invention further comprises: utilizing the persistent data store to retain information estimating the number of electrons or photons that have been integrated into corresponding data.

Another aspect of the invention further comprises: utilizing information from the noise model to evaluate pixel data to quantify the likelihood that a measured variation in the pixel data is due to noise rather than a change in observed situation.

Another aspect of the invention further comprises: applying an output from the noise model to a video signal, to improve suitability of the signal as an input to a stereo disparity search operation.

In another aspect of the invention, buffer data comprises raw captured pixel information.

In another aspect of the invention, image metadata comprises exposure information from an auto-exposure element.

In another aspect of the invention, image metadata comprises white-balance information from an automatic white-balance element.

In another aspect of the invention, image metadata comprises any of black level information, variable gain amplification information, or exposure time information.

In another aspect of the invention, image metadata comprises information generated by a digital camera pipeline.

In another aspect of the invention, image metadata comprises information describing observations made by sensors.

In another aspect of the invention, the sensors comprise at least one camera.

In another aspect of the invention, image metadata comprises information describing the magnitude or presence of actions executed by an imaging pipeline.

In another aspect of the invention, an action executed by an imaging pipeline is a filter operation.

Another aspect of the invention further comprises: utilizing a cumulative average, in which for a given pixel in a captured frame, a captured pixel value is added to a persistent pixel value, and an effective sample count for the persistent pixel is incremented, and wherein a pixel value for a de-noised frame is produced by dividing the sum of pixel values in the persistent pixel by the associated effective sample count for that pixel.

Another aspect of the invention further comprises: providing persistent tracking of the statistical deviation for each pixel value from one captured frame to a next captured frame.

Another aspect of the invention further comprises: utilizing a running average, wherein the standard deviation for a given pixel is utilized to determine a weight to assign to a newly captured pixel value, and a weight to assign to previously captured pixel values, to enable blending the captured pixel value and a persistent pixel value in accordance with the weights, to create a de-noised output pixel value.

In another aspect of the invention, the noise model is a source for blending information useable in executing the blending.

In another aspect of the invention, data corresponding to a captured pixel is blended with data from a corresponding persistent pixel in accordance with a blending ratio, and wherein the blending ratio is influenced by metadata from a corresponding captured frame.

In another aspect of the invention, the metadata from a corresponding captured frame comprises amplification information.

In another aspect of the invention, data from a given pixel is normalized with respect to metadata values from a corresponding captured frame, prior to blending.

Another aspect of the invention further comprises: executing a compression operation on data from a persistent image buffer.

In another aspect of the invention, the compression is lossless.

In another aspect of the invention, the compression is lossy.

In another aspect of the invention, the compression operation is executed in accordance with a selected compression scheme.

In another aspect of the invention, the selected compression scheme is based at least in part on an observation that spatially proximate pixels often have similar values.

In another aspect of the invention, the re-projecting utilizes pixel depth values to increase accuracy of re-projection.

In another aspect of the invention, a pixel depth value is estimated from stereo disparity information.

In another aspect of the invention, a pixel depth value is estimated from information derived from any of a depth sensor, time-of-flight sensor, or structured-light based depth sensor.

In another aspect of the invention, the re-projecting utilizes camera transformation information generated by additional sensors.

In another aspect of the invention, the additional sensors comprise any of at least one accelerometer, gyroscope, or additional camera or set of cameras.

In another aspect of the invention, the re-projecting utilizes camera transformation information generated by a process that interprets data from the same camera or cameras that capture image data, to generate camera transformation information.

In another aspect of the invention, the process that interprets data comprises any of simultaneous location and mapping (SLAM), parallel tracking and mapping (PTAM), or dense tracking and mapping (DTAM).

In another aspect of the invention, (a) the re-projecting utilizes camera transformation information resulting from a stereo disparity search executed on de-noised output data, (b) the camera transformation information results from evaluation across a captured frame, and (c) the camera transformation information is utilized to re-project the persistent image buffer stored prior to camera movement.

Another aspect of the invention further comprises: constructing a lookup table that can be used for all pixel values in a given frame.

Another aspect of the invention further comprises: executing the de-noising operations utilizing computational resources within the digital camera pipeline.

In another aspect of the invention, the computational resources within the digital camera pipeline comprise dedicated hardware elements.

Another aspect of the invention further comprises: utilizing analog information directly generated by the digital camera pipeline.

Another aspect of the invention further comprises: for a given pixel, interpreting each color component value independently of other color component values.

Another aspect of the invention further comprises: estimating noise in one color channel of a given pixel without regard to values of other color channels for the given pixel.

Another aspect of the invention further comprises: constructing a statistical noise model having different parameters for different color channels, to account for differences in sensitivity between different color channels of a given digital camera.

In another aspect of the invention, the different parameters for different color channels comprise a different electron well capacity for a given color channel.

In another aspect of the invention, the different parameters for different color channels comprise: allocating additional sampling to a given color channel.

In another aspect of the invention, the different parameters for different color channels comprise: executing a selected transformation or adjustment differently tier a given color channel.

Another aspect of the invention further comprises: for a given pixel, utilizing a combined pixel value encoding a compound color value.

Another aspect of the invention further comprises: for the given pixel, utilizing an independent-color color space and reducing the pixel value to a scalar quantity.

In another aspect of the invention, the independent-color color space is an RGB color space.

In another aspect of the invention, reducing of the pixel value to a scalar quantity is executed calculating the magnitude of the corresponding 3-dimensional color vector using the Pythagorean theorem.

In another aspect of the invention, reducing of the pixel value to a scalar quantity is executed by utilizing only the value of the largest component of the corresponding color vector.

Another aspect of the invention further comprises: approximating a color vector magnitude.

Another aspect of the invention further comprises: utilizing a combined-color color space and executing noise estimation utilizing the luminance channel alone.

In another aspect of the invention, the combined-color color space is a YUV color space.

The present invention enables the features described herein to be provided at reasonable computational cost, and in a manner easily accommodated within the digital processing capabilities and form factors of modern mobile devices such as tablets and smartphones, as well as the form factors of laptops, PCs, computer-driven televisions, computer-driven projector devices, and the like, does not dramatically alter the economics of building such devices, and is viable within current or near-current communications network/connectivity architectures.

These and other aspects, examples, embodiments and practices of the invention, whether in the form of methods, devices, systems or computer software/program code products will be discussed in greater detail below in the following Detailed Description of the Invention and in connection with the attached drawing figures.

Those skilled in the art will appreciate that while the following detailed description provides sufficient detail to enable one skilled in the art to practice the present invention, the various examples, embodiments and practices of the present invention that are discussed and described below, in conjunction with the attached drawing figures, are provided by way of example, and not by way of limitation. Numerous variations, additions, and other modifications or different implementations of the present invention are possible, and are within the spirit and scope of the invention.

BRIEF DESCRIPTION OF THE DRAWINGS

FIG. 4 is a block diagram depicting an example of a computational noise model in accordance with the invention, incorporating an inverse sensor model, written in the Visual Basic programming language.

FIG. 5 is a schematic block diagram depicting an example, in accordance with the invention, of a persistent image buffer that has been re-projected in response to a camera transformation.

FIGS. 6-12 are flowcharts depicting exemplary practices of the invention.

DETAILED DESCRIPTION OF THE INVENTION

Figure 1:
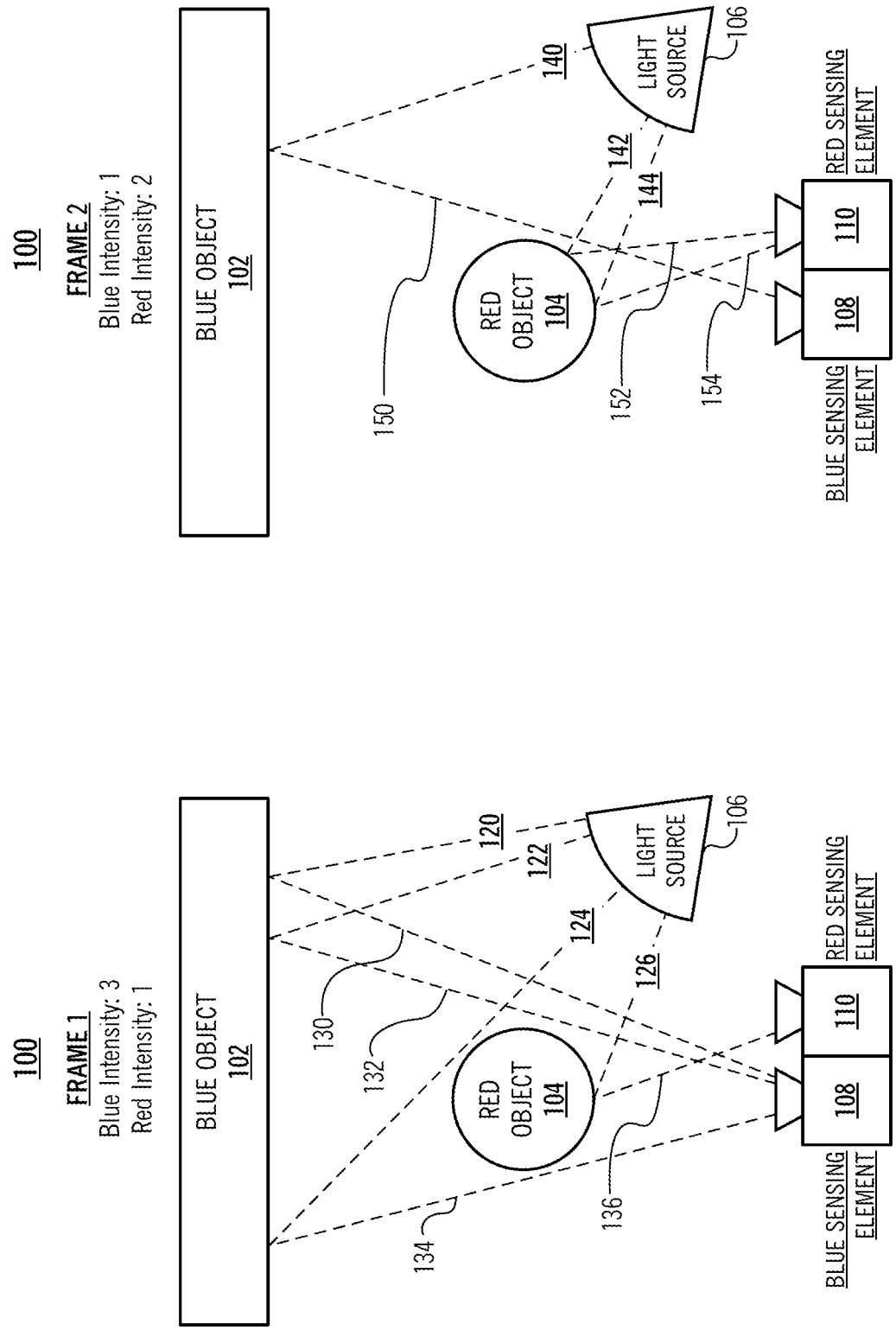
FIG. 1 is a schematic block diagram depicting effects of quantum variations in light distributions on measured values of light it from identical sensors observing an identical scene across equal-length time intervals.

Overview:

The present invention relates to methods systems, devices and computer program code products (software) for improving the temporal stability of a sequence of images captured by a camera (or other sensor) by employing a model of the properties of the expected noise. Exemplary embodiments and practices of the invention thus provide temporal de-noising using a computational model for sensor noise. Aspects, embodiments and practices of the invention can be useful for recognizing whether a change in a portion of an image is due to measurement instability, or due to a meaningful change in the observed situation.

The invention can also be employed to improve the suitability of an image sequence for devices, systems, methods and algorithms that are sensitive to variations between frames, such as motion detection for small objects, or for devices, systems, methods and algorithms that perform comparisons between multiple cameras observing the same scene, such as stereo correspondence detection, as may be used in Virtual 3-Dimensional ("V3D") systems such as those described and claimed in the Applicants' commonly owned patent applications listed above and incorporated by reference herein.

Introduction:

A camera, light sensor or light sensing element (e.g., a pixel in an image produced by a digital camera), observing a static and unchanging scene, should, in theory, observe an identical value during each equal length time interval of observation. (These time intervals may represent, for example, frames captured by a camera continually observing a scene.) In practice, however, this does not occur.

Instead, the intensity of the light produced by the aggregation of the observed photons, as reported by the light sensor, may vary greatly across a small time interval. This manifests as random differences observed in some pixels from one frame of video to the subsequent frame. These random fluctuations create temporal instability whereby an identical scene captured with an identical camera produces a slightly different image from one frame to the next. The shorter the time interval, or the lower the sensor's dynamic range, the more problematic the random fluctuations become.

The variation in values produced by the sensor from one time interval to the next can be partially attributed to the discrete or particle nature of light. This effect is called "Shot noise," or "Schott noise," reflecting its elucidation by physicist Walter Schottky. In particular, the photons detected from one image frame to the next will not be identical due to the discrete quantum behavior of individual photons. Shot noise is most visible in photographs taken in low light conditions. Often, this is due to amplification of very limited data by an image processing pipeline, which may include various configurations of light sensors or cameras, signal amplifiers and other signal processing modules and/or algorithms. Such a pipeline might exist in a digital camcorder, cell phone camera, security camera system, or other digital camera device or system.

In some sensor designs, photons interact with light sensitive electronic devices or elements, causing electric charge to build up in a capacitive element known as an electron well. To retrieve the value for the luminance observed by the sensing element, the charge levels are read and then encoded as a digital number using an analog to digital converter. In many instances, the "read" process and the analog to digital conversion process can further introduce error. This source of error is often referred to as "read noise." Read noise and shot noise combine with other noise sources to produce fluctuating pixel values from a camera pipeline.

See, for example, FIG. 1, which is a schematic diagram depicting the effects of quantum variations in light distributions on the measured values of light intensities from identical sensors observing an identical scene across equal-length time intervals. Compare, for example, the differences in measured values of Red and Blue intensities between Frame 1 and Frame 2, even with no change in relative positions or orientations of the light source, objects, and sensors.

In particular, FIG. 1 depicts a configuration 100 of light source, objects and sensors, across two imaging frames, Frame 1 (left-hand side of FIG. 1) and Frame 2 (right-hand side of FIG. 1). The collective configuration 1110 includes a blue object 102, a red object 104, a light source 106, a blue sensing element 108 and a red sensing element 110. In Frame 1, exemplary light rays 120, 122, 124, and 126 emanate from light source 106, with rays 120, 122 and 124 striking blue object 102, and ray 126 striking red object 104. In Frame 1, rays 130, 132 and 134 reflect from blue object 102 and are detected by blue sensor 108, yielding a Blue Intensity of 3 for Frame 1; and ray 136 reflects from red object 104 and is detected by red sensor 110, yielding a Red Intensity of 1 for Frame 1.

In Frame 2, rays 140, 142 and 144 emanate from light source 106, with ray 140 striking blue object 102, and rays 142 and 144 striking red object 104. In Frame 2, ray 150 reflects from blue object 102 and is detected by blue sensing element 108; and rays 152 and 154 reflect from red object 104 and are detected by red sensing element 110, yielding a Blue Intensity of 1 and a Red Intensity of 2 for Frame 2.

With no change in the relative positions or orientations of the light source, objects and sensors from Frame 1 to Frame 2, FIG. 1 illustrates that this difference can be attributable to the effects of quantum variations in light distribution.

By way of example, a typical modern cell-phone sensor (camera) may capture as few as several thousand individual electrons in the electron well of a sensing element during the capture of an 8 millisecond image frame. In this exemplary sensor, the value is then encoded as an 8 bit number ranging from 0 to 255 levels of intensity. This means only a handful of electrons represent the difference between one digital intensity level value and the adjacent value.

If the sensor or camera pipeline applies a gain function, this can exacerbate the instability by adding additional error, and by magnifying error from other sources. For example, if the gain is applied using analog electronics, then more noise may be introduced. If the gain is applied to the digital data, quantization error may occur before a low precision number is multiplied.

In the sensor of the example above, the frame-to-frame values for a single pixel may fluctuate by as much as 25% of the total measured value, even with absolutely no change to the external situation. This includes a perfectly static camera orientation, unchanged camera setting and configuration, and no changes to external objects and lighting. This means that a measurement may only be accurate to plus or minus 32 values from a possible 256 representable values. Effectively this means that, for a single pixel from a single frame in the worst case, an accurate and stable value for a pixel can only be known with certainty among 4 possible intensity values, each value representing a large range of light intensity.

In a typical instance, the effect is not as extreme as in the worst case. The millions of pixels across a sensor, viewed in aggregate, tend to average out most of the noise effects when performing simple photography operations. This leads to a visually, acceptable image in spite of extreme fluctuations in the values from individual sensing elements.

However, the Applicants have observed that beyond simple photography operations intended to produce an image for direct viewing, the fluctuations and noise may be very problematic for devices, methods, processes and algorithms rely on temporal stability from one image frame to the next. This problem is made worse when small parts of an image or individual pixels are examined individually. Such an examination is executed, for example, in connection with stereo correspondence operations, such as those described in the Applicants' commonly owned patent applications listed above and incorporated by reference herein.

Computational/Statistical Model of the Sensor

While the photons, and therefore light intensity readouts, observed from one time interval to the next will have inherent variance, the variance from one time interval to the next will statistically cancel out as the amount of measurement increases. The noise will represent an increasingly less significant proportion of the value as the exposure time increases, provided the sensor has adequate dynamic range to capture all photons during the exposure. Similarly, the average of many time intervals or frames should eventually converge on a true and correct result if the conditions of the observation have indeed not changed. As Schottky observed, the error should diminish in proportion to the square root of the amount of measurement.

Given this, the Applicants have determined that in accordance with the present invention, it is possible to construct a statistical model of the sensor that can be used to quantify the reliability of a measured value, given information about the sensor properties, and additional factors used by the sensor pipeline to construct the image, such as the black level, the sensor gain levels, exposure time and other parameters.

In accordance with the present invention, the model can be designed to emulate the inverse of the behavior of the sensor pipeline's electronics.

In accordance with the present invention, the model can be designed to take a pixel value as input, and estimate the number of electrons in the electron well for a sensing element, and therefore the number of photons that reached that sensing element during the frame capture interval.

Exemplary embodiments and practices of the invention utilize predictions from the above-described statistical model to produce a reduced-noise ("de-noised") image or signal, by selectively incorporating data from earlier measured intervals or frames. By incorporating data from multiple frames, it is possible to arrive at a more accurate solution than could be obtained from any one frame alone.

Exemplary embodiments and practices of the invention utilize a persistent data store to retain and integrate data from previous frames or time intervals.

Exemplary embodiments and practices of the invention can also use this data store to retain additional information, such as the number of valid samples, or the number of electrons or photons or microseconds that have been integrated into the data; and/or can use other meta-data representing the quality of the data.

In addition, in exemplary embodiments and practices of the invention, information from the model can be used to quantify the likelihood that a measured variation is due to noise, versus when the variation is indicative of a change in the observed situation.

The invention can be applied to a video signal to improve the suitability of that signal to be used as an input to a stereo disparity search operation, as is taught in the Applicants' commonly owned patent applications listed above and incorporated by reference herein.

The Applicants have recognized that even for frames captured with a comparatively large time interval, the temporal instability in pixel values can be problematic for systems, devices, methods or algorithms that rely on the identification of identical portions of a scene or image, such as stereo image comparison. In many instances, the temporal variance in raw pixel values is not apparently visible when viewing the image directly. This is partially due to bright pixels reaching a saturation threshold or a tone mapping operation effectively reducing the dynamic range for bright pixels. However, the detail present in the raw values representing the bright pixels is very significant to achieving accurate stereo correspondence.

The absolute amount of photon variance due to shot noise is proportional to the absolute number of photons observed. In other words, shot noise occurs irrespective of brightness, so the proportion of noise will have similar properties in bright pixels as well as dark pixels; but algorithms that rely on comparison or subtraction of raw pixel intensity values will detect more variance in bright pixels than in dim pixels with the same amount of noise.

Various embodiments and practices of the present invention may be implemented within a sensor/camera pipeline, including camera pipelines of otherwise convention design, or they may be implemented in the form of a software or hardware module that consumes the output from one or more traditional sensor or camera pipelines in order to produce higher quality and more temporally stable image data and images.

Exemplary De-Noising Pipeline

Figure 2:
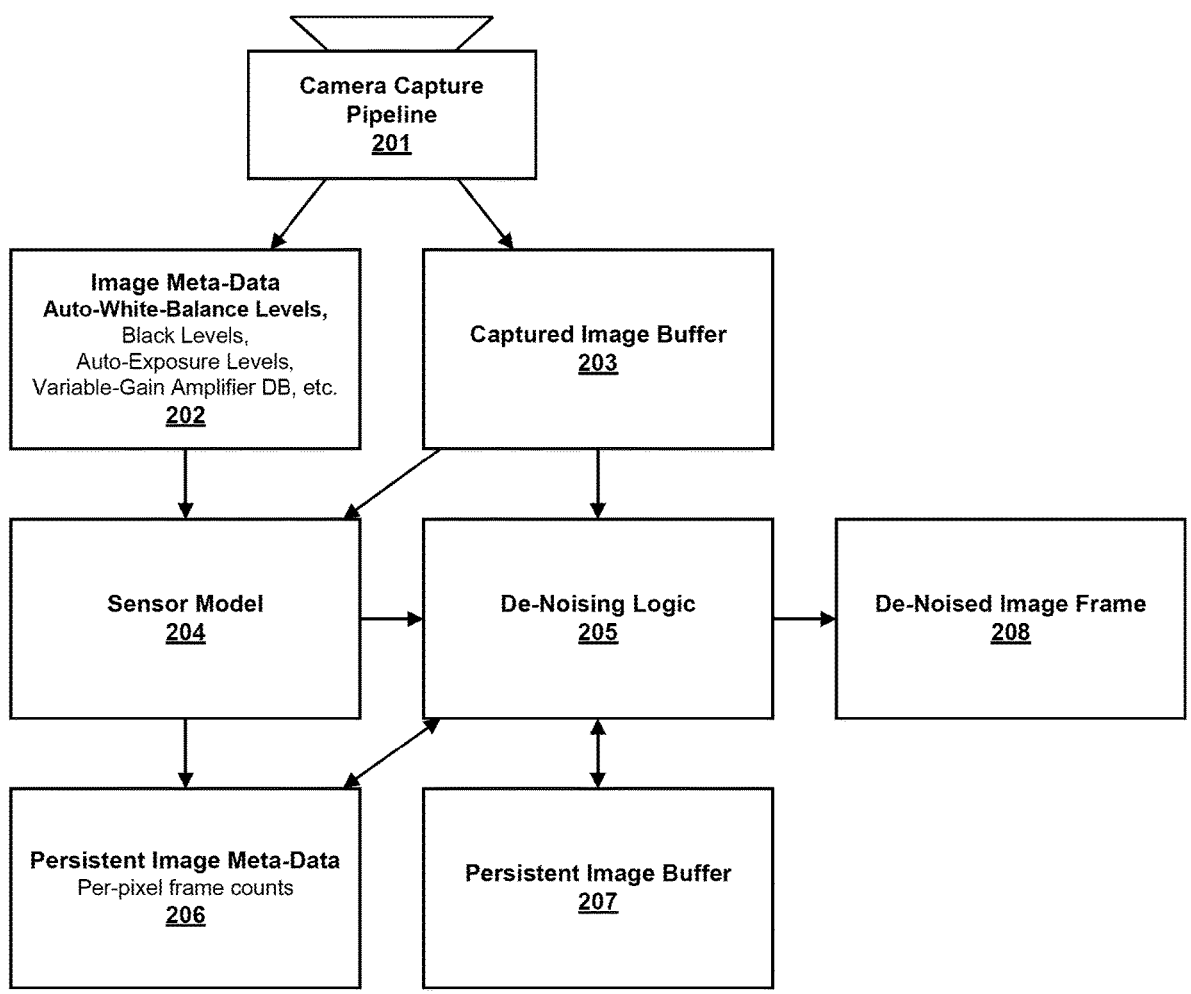
FIG. 2 is a schematic block diagram of an example of a de-noising processing pipeline in accordance with the invention, to implement de-noising in a sequence of images produced by a camera/image capture pipeline.

FIG. 2 depicts an exemplary pipeline, in accordance with embodiments and practices of the present invention, for implementing de-noising to a sequence of images produced by an otherwise conventional camera pipeline.

As shown in FIG. 2, in an exemplary practice or embodiment of the invention, frames of image data are produced by a camera connected to an image processing pipeline 201. For each frame, the camera pipeline outputs a 2-dimensional (2D) matrix of digital pixel value information (captured image buffer 203), along with image metadata 202.

Captured image buffer 203 is also referred to herein as a frame buffer or camera frame buffer. Note that while FIG. 2 depicts captured image buffer or camera frame buffer 203 as a single block, the functions of the captured image buffer can be divided between two or more elements, which may in some embodiments include elements in camera capture pipeline 201. FIG. 2 is merely schematic in nature, and many variations thereto are possible, and are within the spirit and scope of the present invention.

In some embodiments or practices, the captured image buffer data can represent, can comprise, or be constituted by, raw captured pixel information, prior to any tone mapping operation or other operation that further reduces the sensor's dynamic range.

In some embodiments or practices, the image metadata can include exposure information from an auto-exposure feature in the camera pipeline, and/or white-balance information from an automatic white-balance feature, which can be generated by otherwise conventional camera pipelines.

The image meta-data may also include black level information, variable gain amplification information, exposure time information, and additional information produced by the otherwise conventional camera or imaging pipeline. The information may describe external observations made by sensors including the camera itself, or it may describe the magnitude or presence of actions, such as filter operations, performed by the imaging pipeline.

In accordance with exemplary practices and embodiments of the present invention, Sensor Model 204 is operable to consume the captured image buffer 203 and the image meta-data 202, and apply selected parameters and logic operations, examples of which are described in greater detail below, to estimate the proportion of noise contained within the value for each pixel in image buffer 203. The sensor model may consume data from the captured image buffer by reading it from a memory.

In an exemplary practice or embodiment of the invention, the sensor model comprises a mathematical model designed to approximate the inverse behavior of the camera capture pipeline 201.

Further in accordance with exemplar y practices and embodiments of the present invention, the captured pixel buffer 203 and the output of the sensor model 204 is made available to de-noising logic 205. The de-noising logic 205 produces de-noised output frames 208, in accordance with the present invention, by blending data from the captured image buffer 203 and a persistent image buffer 207. The blending function for each pixel in the image may depend on the output of sensor model 204.

In addition, in accordance with exemplary practices and embodiments of the present invention, data from image buffer 203 may be integrated into persistent image buffer 207, and metadata in the persistent image metadata storage 206 may be updated dynamically. In this manner, as more frames are processed, the data in the persistent image buffer 207 and the persistent image metadata 206 become increasingly reliable, and therefore the noise and variance in successive output frames will decrease.

The respective formats of the persistent image data in persistent image buffer 207 and the frame buffer or captured image buffer 203 need not be the same. By way of example, the persistent image data does not need to be a rectangular matrix that resembles a conventional frame buffer, but instead could be a cache indexed by a 2D or 3D spatial position. A 3-dimensional (3D), or multi-layered matrix could also be used, and this would enable persistent information to be retained about areas that are temporarily occluded, while also tracking information about the objects that are occluding them.

Also, there need not be a one-to-one correspondence between frame buffer pixels and an element in the persistent image buffer. A number of types of correspondence, along a continuum of types of correspondence, are possible and are within the scope of the present invention. These types of correspondence can include, but are not limited to, the following:

1.) The persistent image buffer aligns with a camera frame buffer such that there is a substantially (or in some instances exactly) one-to-one correspondence between a given frame buffer pixel and an element in the persistent image buffer, when each is addressed in the same coordinate space. This is useful in a static camera situation, because the least data is lost prior to the application of the de-noising model.

2.) The persistent image buffer aligns with a post-transformed or rectified image buffer, such that a selected transform relates a given frame buffer pixel and an element in the persistent image buffer. Thus, in this example, the correspondence with camera frame buffer pixels is not one-to-one, because pixels might be stretched and blended during the image transformation, but there is a direct mathematical transform that relates one to the other. In accordance with the invention, the selected transform can be changed or adjusted on a frame-by-frame basis. The selected transformation can comprise any of a rectification operation, pixel stretch or blending operation, re-projection, correction for lens effects, or transformation enabling the persistent image buffer to represent data in a format different from the data format of the frame buffer. This practice of the invention offers a number of advantages, such as beings robust against some types of camera motion, and/or allowing some image stabilization. Such practices are also relatively simple and inexpensive to implement.

3.) The persistent image buffer is an abstract data structure. In this case, the correspondence between a given frame buffer pixel and an element in the persistent image buffer can be arbitrarily complicated, and may involve a lookup into a data structure, potentially with at least one level of indirection. This practice of the invention, among the three examples noted, provides the most flexible implementation and the greatest robustness against camera and object motion. It may also provide higher quality data than example (2) above, because the pixel data itself is not being manipulated prior to the de-noising. The potential disadvantage of this practice of the invention is implementation complexity and computational cost.

Figure 3:
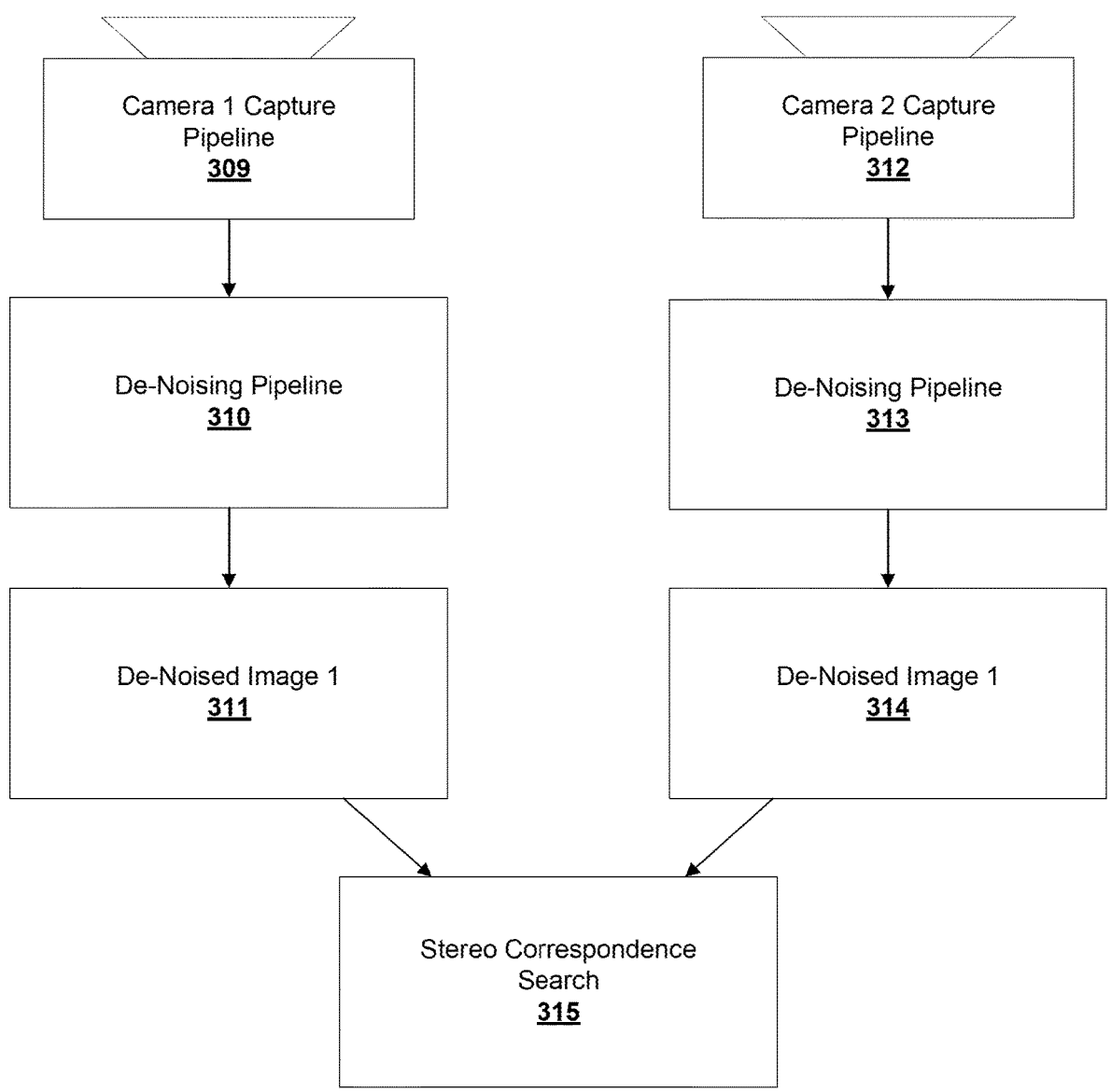
FIG. 3 is a schematic block diagram of an exemplary embodiment of the invention, in which de-noised output frames are used to perform stereo correspondence analysis in a multi-camera system.

FIG. 3 depicts another exemplary embodiment of the invention, in which de-noised output frames are used to perform stereo correspondence analysis in a multi-camera system. In the embodiment depicted by way of example in FIG. 3, the output from two cameras is examined for stereo correspondence by Stereo Correspondence Search module 315. Prior to that, frames are generated by camera pipelines 309 and 312 in parallel. These frames are made available, along with all appropriate frame metadata, to de-noising pipelines 310 and 313. It should be noted that while these pipelines are conceptually separate, they may share some hardware components in their implementation. FIG. 3 is merely schematic in nature, and many variations thereto are possible, and are within the spirit and scope of the present invention.

Referring again to FIG. 3, de-noising pipelines 310 and 313 each output de-noised frame information, 311 and 314, respectively. This information may be expressed as raw pixel values without any tone mapping function or saturations thresholds applied. De-noised frame information or images 311 and 314 are then made available to Stereo Correspondence Search module 315 to perform a stereo correspondence search. This module, and the stereo correspondence search operations, can be executed in accordance with the teachings of the Applicants' commonly-owned patent applications listed above and incorporated by reference herein.

Noise Model Including Inverse Sensor Model

In an exemplary practice or embodiment of the present invention, a computational model constructed in accordance with the invention will computationally attempt to estimate the number of electrons in the electron wells for each pixel, based on the digital pixel values from the captured image buffer. To do this, the model may utilize a known electron well capacity, which is an intrinsic property of a camera sensor. This value may be adjusted by a calibration process. The calibration process may have already been performed as part of an initialization routine, or as part of a device manufacturing process.

In an exemplary practice or embodiment of the present invention, the effects of a variable-gain amplifier within the camera image pipeline are also factored into the model. Because any noise that is present in the signal will be amplified by the amplification process, the model should reflect this effect. In many instances, an amplifier in a camera image pipeline applies a logarithmic gain function to match human perception. In accordance with an exemplary practice of the invention, the sensor model computationally applies the inverse of the function applied by the camera pipeline function.

In many instances, a conventional camera pipeline and its modules will provide an indication of the gain from the amplification step applied to the camera, so the computational model of the present invention can utilize or consume this indicated value as an input parameter. (This value is typically provided in decibels.)

Similarly, in many instances, a conventional camera pipeline and its modules will provide an indication of the black level. This too, can be used, in accordance with an exemplary practice of the present invention, as an input parameter to the inverse sensor model.

FIG. 4 depicts an example of a computational noise model in accordance with the present invention incorporating an inverse sensor model, written in the Visual Basic programming language.

As shown in FIG. 4, an example of a computational noise model in accordance with the present invention, incorporating an inverse sensor model, is as follows:

```
Public Function NoiseModel(Luminance_ADU8 As Single, BlackLevel_ADU8 As
Single, GainFactor As Single) As Single
    ' sensor electron well capacity = 8960 electrons
    ' compute the number of electrons represented by one incremental value of a 16 bit number
    e_per_adu16 = (8960#) / 65536#
    ' compute the number of electrons represented by one incremental value of an 8 bit number
    e_per_adu8 = e_per_adu16 * 256#
    ' approximate the sensor read noise with a constant number of electrons in the model
    read_noise_e = 10.32
    ' the sigma to apply to the estimated shot noise
    shot_noise_sigma = 2#
    ' the number of prior samples factored into the measured luminance.
In this case, simply 1 as the model is applied to a single frame
    sample count = 1#
    ' apply the black level and invert the sensor gain function to estimate the number of electrons in
the sensing element's electron well
    luminance_minus_blacklevel = Max(0, Luminance_ADU8 −
BlackLevel_ADU8)
    combined_gain = GainFactor * DecibelsToLinearFactor(11#) '11dNB of
fixed gain in the sensor
    avg_e = (luminance_minus_blacklevel * e_per_adu8) / combined_gain ' average number of
electrons in the sensor well
    ' estimate the number of the electrons due to shot noise and read noise
    shot_noise_e = Sqr(Max(0, avg_e − read_noise_e)) * shot_noise_sigma
' shot noise in electrons
    total_noise_e = shot_noise_e +read_noise_e ' add read noise constant to get total
noise
    ' divide by square root of sample_count to estimate noise with multiple samples
    total_noise_e = total_noise_e / Sqr(sample_count)
    ' convert the noise estimate from an electron count back to a value expressed in an 8bit number
    total_noise_adu8 = (total_noise_e / e_per_adu8) * combined_gain
    NoiseModel = total_noise_adu8
End Function
```

A larger electron well capacity and a sufficient exposure time will translate to a corresponding reduction in noise. This basic property exists regardless of the physical and electrical technologies employed by the sensor. In any light sensing element, an increase in the sensor's dynamic range combined with an exposure time interval sufficient to make use of the sensor's range will result in a corresponding decrease in noise. The reduction in noise will follow the inverse square root relationship described by Schottky.

Similarly, the noise will also decrease if multiple samples, i.e. frames, of data are integrated. Additional samples will also decrease noise following the inverse square root relationship.

De-Noised Output Using Persistent Image Data

In exemplary practices and embodiments of the present invention, de-noising logic is operable to store persistent data associated with pixels. In many instances, this persistent data may take the form of an average pixel value. Alternatively, this data may be a sum of pixel values over an interval of frames, or it may be another aggregation of pixel values across time.

In an exemplary embodiment, an average pixel value is stored for each pixel using a cumulative average. For each pixel in each captured frame, the captured pixel value is added to the persistent pixel value, and the effective sample count for the persistent pixel is incremented. Then, a pixel value for a de-noised frame can be produced by dividing the sum of pixel values in the persistent pixel by the associated effective sample count for that pixel.

An exemplary embodiment of the present invention can include the persistent tracking of the statistical deviation for each pixel value from one captured frame to the next.

In another embodiment, a running average is used. In this embodiment, the standard deviation for a given pixel can be used to determine the proportion of weight to assign to the newly captured pixel value, and the proportion of weight to assign to the previously captured values, for the purpose of blending the captured pixel value and the persistent pixel value to create a de-noised output pixel value. Alternatively, the noise model may be a source for this blending information.

In yet another embodiment, the data pertaining to a captured pixel is blended with data from a corresponding persistent pixel, where the blending ratios are influenced by metadata from the corresponding captured frame. For example, a frame for which a high gain amplification has been applied would contribute less to a blended value than a frame for which less amplification was applied.

Similarly, various practices or embodiments of the present invention can normalize the data from the pixels with respect to values from the captured frame meta-data prior to blending.

The Applicants have recognized that in some instances, the captured pixel value will strongly disagree with the associated persistent pixel value. This disagreement may occur if a captured pixel value is outside of an acceptable deviation associated with a persistent pixel value. Alternatively, it may occur if a persistent pixel value is outside of the error range predicted by the noise model. Such disagreement is often indicative of a change in the observed situation. In such an instance, an exemplary embodiment of the present invention may wholly or partially invalidate the associated persistent pixel data and meta-data.

In some embodiments of the invention, the persistent data may be compressed. This compression may be a lossless compression, or a loss compression. The compression scheme may also utilize the observation that spatially nearby pixels often have similar values.

Re-Projection of Persistent Pixel Values

The Applicants have implemented various embodiments and practices of the present invention, and such implementations have been observed to produce excellent results when the camera is relatively still, as might occur in a number of practical applications and devices, such as a security camera system, or a stationary video conferencing appliance.

However, camera motion, even as minor as small vibrations, may result in constant invalidation of much of the persistent pixel values from frame to frame.

The Applicants have determined, however, that this problem can be largely solved by re-projection or "warping" of the persistent pixel values to compensate for camera movement. If an accurate spatial transformation for the camera, i.e. movement from the previous camera position and orientation, can be determined, many of the values in the persistent pixel buffer may be salvaged and used, through a re-projection transform in accordance with the present invention.

By way of example, see FIG. 5, which is a schematic diagram depicting a persistent image buffer that has been re-projected in response to a camera transformation (in this instance, primarily rotation). Compare, for example, the "Original Perspective" and "Re-Projected Perspective" in FIG. 5.

In particular, FIG. 5 depicts a configuration 500 of sensor or camera, persistent image buffer, and objects, including blue object 502, green object 504, sensor or camera 506, and persistent image buffer 508. The exemplary persistent image buffer 508 schematically depicted in FIG. 5 has five elements 531, 532, 533, 514 and 535.

In the "Original Perspective" (left-hand side of FIG. 5), exemplary rays 521, 522, 523, 524 and 525 radiate to sensor or camera 506. Rays 521, 522, 524 and 525 trace to the camera 506 from the blue object 502; and ray 523 radiates to the camera 506 from the green object 504, such that the persistent image buffer 508 has values, in its respective elements, of B-B-G-B-B (where B represents Blue and G represents Green).

On the right-hand side of FIG. 5, the "Re-Projected Perspective" schematically shows that the persistent image buffer has been re-projected in response to a camera transformation (in the example shown in FIG. 5, primarily rotation). Given the re-projection, ray 521 radiates to the camera 506 from the blue object 502; rays 522 and 523 trace to the camera 506 from the green object 504; but rays 524 and 525, which trace to the camera 506, do not emanate or originate from any defined object. As a result, for the "Re-Projected Perspective" example shown in FIG. 5, the persistent image buffer 508 has values of B-G-G-?-?.

In exemplary practices and embodiments of the present invention, if the camera transformation comprises primarily rotation, or if the scene being observed is reasonably uniform in depth, then the re-projection operation is straightforward, and will yield high quality results. If the camera position transformation involves large translation, or if the scene depth varies significantly, the re-projection operation becomes more complex, due to occlusion and disocclusion of portions of the scene.

Nonetheless, the Applicants have recognized that depth information will allow large parts of the scene to be accurately re-projected, leading to higher quality results than would otherwise occur immediately following camera movement.

As noted above, exemplary practices and embodiments of the present invention are well suited to utilization in combination with a stereo image comparison algorithm, method, device or system, which is often used to generate stereo disparity information. (See, for example, the Applicants' commonly owned patent applications listed above and incorporated herein by reference.) This stereo disparity information can be combined with a known device camera configuration to estimate a depth value for each pixel. In accordance with exemplary practices and embodiments, of the present invention, this depth value can then be used to perform more accurate re-projection of the persistent pixel information.

In some exemplary embodiments, the camera transformation or tracking can be produced using additional sensors, such as an accelerometer, gyroscope, or another camera or set of cameras. The transformation information may also be a result of various known processes, such as SLAM, PTAM, DTAM, or the like, interpreting data from the same camera or cameras.

In other exemplary embodiments of the present invention, the camera transformation information can be a result of the information from a stereo disparity search on the de-noised output data. In such an embodiment, the initial quality of the de-noised data would be relatively poor, immediately following the camera movement. But across an entire frame, it may be possible to obtain an accurate camera transformation. Then this camera transformation can be utilized to re-project the persistent image buffer stored prior to the camera movement. This approach would sharply reduce the number of frames needed to achieve a low-noise result in many of the pixels.

Optimizations and Implementation Options

The computational cost of constructing and utilizing the noise model of the present invention is comparatively low, but evaluating it for every pixel for every frame can be a non-trivial amount of computational cost. Given that many properties of the noise model are constant across an entire frame, including, for example, the black-level, the exposure time, the variable gain, and other parameters, it is possible, in accordance with an exemplary practice of the present invention, to construct a lookup table that can be used for all pixel values in a frame. A lookup table drastically reduces the amount of computation required to evaluate the noise model for each pixel.

Another exemplary practice or embodiment of the present invention is to utilize computational resources within dedicated hardware, such as an imaging pipeline itself. Dedicated hardware may emulate the methods, practices and/or software functions of the present invention as described above, and can also further benefit from accessing data or analog information in the camera pipeline before it has undergone some image processing operations. For example, a hardware implementation may benefit from reading the voltage level from a sensing element before a variable gain amplification has been applied, thus eliminating the need to reverse the effects of the gain when estimating the noise in the data.

Treatment of Color Channels

In a typical buffer of image data, colors are represented with independent components of an array data structure, for example, red, green, and blue components, typically referred to as RGB. This data is often produced by a sensor implementation in which each light sensing element is occluded by a colored filter that only allows a range of light wavelengths to pass through. In effect, some of the sensing elements are sensitive to certain colors, while other sensing elements are sensitive to other colors. While RGB is the most commonly used independent-color color space, some cameras employ alternate schemes. The exemplary practices and embodiments of the present invention can also function advantageously in color spaces other than RGB.

In one embodiment of the present invention, each color component value is interpreted and modified in isolation. For example, the noise in the red channel of a pixel may be estimated without regard to the values of the green and blue channels of the same pixel. This approach will provide greater accuracy than an approach that interprets the pixel as a single value.

Digital cameras often employ a Bayer Pattern or a similar distribution of color sensing elements. In a Bayer Pattern, there are twice the number of green sensitive elements, when compared to the number of red sensitive or blue sensitive elements. This is to account for the higher level of sensitivity to green light in the human eye. In effect, this means the green channel receives twice the number of samples as the red or the blue channel. Therefore, there will be a correspondingly lower amount of noise associated with the green channel. In accordance with an exemplary practice of the present invention, the parameters of the statistical model constructed in accordance with the invention may be different for the green channel, to account for this effect. The model may reflect this effect as an additional sample, or it may alternatively reflect this as a larger electron well capacity, or it may apply a similar or corresponding transformation or adjustment elsewhere.

For simplicity or for increased performance, it is also possible to perform one operation for a combined value encoding a compound color value. If an independent-color color space such as RGB is used, the pixel value may be reduced to a scalar quantity. In accordance with the present invention, one method to perform this reduction is to calculate the magnitude of the 3-dimensional color vector using the Pythagorean theorem. Another method in accordance with the present invention is to use only the value of the largest component of the color vector.

There are many known methods to approximate a vector magnitude, with varying computational costs.

If a combined-color color space is used, such as YUV, it is possible to perform the noise estimation with the luminance channel alone.

Digital Processing Environment in Which Invention can be Implemented

Those skilled in the art will understand that the above described embodiments, practices and examples of the invention can be implemented using known forms of cameras, sensors, camera pipelines, digital networks, computer processor and telecommunications devices, in which the telecommunications devices can include known forms of cellphones, smartphones, and other known forms of mobile devices, tablet computers, desktop and laptop computers, and known forms of digital network components and server/cloud/network/client architectures that enable communications between such devices.

Those skilled in the art will also understand that method aspects of the present invention can be executed in commercially available digital processing systems, such as servers, PCs, laptop computers, tablet computers, cellphones, smartphones and other forms of mobile devices, as well as known forms of digital networks, including architectures comprising server, cloud, network, and client aspects, for communications between such devices.

The terms "computer software," "computer code product," and "computer program product" as used herein can encompass any set of computer-readable programs instructions encoded on a non-transitory computer readable medium. A computer readable medium can encompass any form of computer readable element, including, but not limited to, a computer hard disk, computer floppy disk, computer-readable flash drive, computer-readable RAM or ROM element or any other known means of encoding, storing or providing digital information, whether local to or remote from the cellphone, smartphone, tablet computer, PC, laptop, computer-driven television, or other digital processing device or system. Various forms of computer readable elements and media are well known in the computing arts, and their selection is left to the implementer.

In addition, those skilled in the art will understand that the invention can be implemented using computer program modules and digital processing hardware elements, including memory units and other data storage units, and including commercially available processing units, memory units, computers, servers, smartphones and other computing and telecommunications devices. The term "modules", "program modules", "components", and the like include computer program instructions, objects, components, data structures, and the like that can be executed to perform selected tasks or achieve selected outcomes. The various modules shown in the drawings and discussed in the description herein refer to computer-based or digital processor-based elements that can be implemented as software, hardware, firmware and/or other suitable components, taken separately or in combination, that provide the functions described herein, and which may be read from computer storage or memory, loaded into the memory of a digital processor or set of digital processors, connected via a bus, a communications network, or other communications pathways, which, taken together, constitute an embodiment of the present invention.

The terms "data storage module", "data storage element", "memory element" and the like, as used herein, can refer to any appropriate memory element usable for storing program instructions, machine readable files, databases, and other data structures. The various digital processing, memory and storage elements described herein can be implemented to operate on a single computing device or system, such as a server or collection of servers, or they can be implemented and inter-operated on various devices across a network, whether in a server-client arrangement, server-cloud-client arrangement, or other configuration in which client devices can communicate with allocated resources, functions or applications programs, or with a server, via a communications network.

It will also be understood that computer program instructions suitable for a practice of the present invention can be written in any of a wide range of computer programming languages, including Visual Basic, Java, C++, and the like. It will also be understood that method operations shown in the flowcharts can be executed in different orders, and that not all operations shown need be executed, and that many other combinations of method operations are within the scope of the invention as defined by the attached claims. Moreover, the functions provided by the modules and elements shown in the drawings and described in the foregoing description can be combined or sub-divided in various ways, and still be within the scope of the invention as defined by the attached claims.

The Applicants have implemented aspects of the present invention, in prototype form. One implementation comprises a complete device, including four cameras, capable of encoding content and receiving (full-duplex communication). Another is an Apple iPhone-based implementation that can receive and present immersive content (receive-only).

The Applicants used the following hardware and software structures and tools, among others, to create the two noted implementations, collectively:
1. A seven inch 1280x800 IPS LCD display.
2. Four PointGrey Chameleon3 (CM3-U3-13S2C-CS) 1.3 Megapixel camera modules with ⅓" sensor size assembled on an aluminum plate with shutter synchronization circuit.
3. Sunex DSL377A-650-F/2.8 M12 wide-angle lenses.
4. An Intel Core i7-6770HQ processor which includes on-chip the following:
   a. An Intel HD Graphics 580 Integrated Graphics Processing Unit; and
   b. An Intel QuickSync video encode and decode hardware pipeline.
5. OpenCL API using Intel Media SDK running on Linux operating system to implement, among other aspects: Image Rectification, Fast Dense Disparity Estimate(s) (FDDE) and Multi-level Disparity Histogram aspects.
6. OpenGL API running on Linux operating system to implement Multiple Native Disparity Map Voting and image reconstruction.
7. Intel Media SDK to access Intel QuickSync video compression hardware.
8. PhidgetSpatial 0/0/3 Basic accelerometer module and Linux APT to determine device orientation.
9. DLIB Face Detection library to locate presence of viewer's face.
10. In addition, the Apple iOS SDK was used to access accelerometer, gyroscope and compass for device orientation and to access video decode hardware: and the OpenGL ES API to implement multiple native disparity map voting and image reconstruction to enable an iPhone-based prototype of a receiving device.

Flowcharts of Exemplary Practices of the Invention

FIGS. 6-12 are flowcharts depicting method aspects and exemplary practices of the invention. The methods depicted in these flowcharts are examples only; the organization, order and number of operations in the exemplary practices can be varied; and the exemplary practices and methods can be arranged or ordered differently, and include different or additional functions, whether singly or in combination, while still being within the spirit and scope of the present invention.

Elements shown in the flowcharts in parentheses are, among other aspects, optional in a given practice of the invention.

In addition to the discussion below, all the text and respective textual elements of the accompanying flowcharts are incorporated by reference into this Detailed Description of the Invention as if set forth in their entireties in this Detailed Description of the Invention, in the respective order in which they appear in the flowcharts, while noting that the organization, order and number of operations in the exemplary practices can be varied; and the exemplary practices and methods can be arranged or ordered differently, and include different or additional functions.

In particular, FIG. 6 shows a temporal de-noising method 600 according to an exemplary practice of the invention, comprising the following operations:
600. Temporal De-Noising:
601. Receive at least one frame of image pixel data from a digital camera pipeline;
602. Receive image metadata corresponding to the at least one received frame;

603. Execute temporal de-noising operations for at least selected pixels of the at least one received frame of image pixel data:
  603.1 Evaluate a noise model to estimate the noise present in a selected pixel from the at least one received frame;
  603.2 Blend data from a persistent image buffer with data from the at least one received frame;
  603.3 Update data in the persistent image buffer; and
603.4 Output the blended pixel data to a reduced-noise frame buffer, thereby to generate a reduced-noise image frame.

FIG. 7 depicts aspects of a noise model or models in accordance with the invention, comprising the following:
700. Noise Model:
(701 Noise model comprises a simulation of the inverse behavior of at least selected aspects of the digital camera pipeline.)
(702. Noise model comprises a simulation of the inverse of the behavior of a variable gain amplifier.)
(703. Noise model comprises a simulation of the inverse of the behavior of automatic white-balance logic.)
(704. Noise model comprises a simulation of the inverse of the behavior of automatic exposure control.)
(705. Noise model comprises a simulation of the number of electrons in an electron well associated with a light sensing element of the digital camera pipeline.)
(706. Evaluating a noise model comprises interpolating between coefficients in a lookup table.)
(707. Noise model is evaluated in a manner dependent on the color represented by image pixel data.)
(708. At least one lookup table is generated in response to meta-data associated with at least one received frame.)
(709. Utilize information from the noise model to evaluate pixel data to quantify the likelihood that a measured variation in the pixel data is due to noise rather than a change in observed situation)
(710. Apply an output from the noise model to a video signal, to improve suitability of the signal as an input to a stereo disparity search operation)
(711. Noise model is a source for blending information useable in executing blending.)

FIG. 8 depicts aspects of a persistent image buffer or buffers in accordance with exemplary practices of the invention, comprising the following:
800. Persistent Image Buffer:
(801. Persistent image buffer comprises a summation of data from prior frames.)
(802. Persistent image buffer comprises an average of data from prior frames.)
(803. At least one pixel in persistent image buffer is invalidated in response to selected result of evaluation of noise model.)
(804. At least one pixel in persistent image buffer is invalidated in response to a selected result of a comparison with a pixel from the at least one received frame.)
(805.1. The persistent image buffer can align with a camera frame buffer, such that there exists a substantially one-to-one correspondence between a given frame buffer pixel and an element in the persistent image buffer, when each is addressed in the same coordinate space.)
(805.2 The persistent image buffer can align with a post-transformed image buffer, such that a selected transform relates a given frame butter pixel and an element in the persistent image buffer.)
  (805.2.1 The transform is a rectification operation.)
  (805.2.2 The transform comprises any of pixel stretch or blending operations, re-projection, correction for lens effects, or transformation enabling the persistent image buffer to represent data in a format different from the data format of the frame buffer.)
  (805.2.3 The transform can be changed on a frame-by-frame basis.)
(805.3 The persistent image buffer can be an abstract data structure, and correspondence between a given frame buffer pixel and an element in the persistent image buffer is of arbitrary complexity.)
  (805.3.1 Correspondence between a given frame buffer pixel and an element in the persistent image buffer comprises a lookup operation into a data structure.)
  (805.3.2 The lookup operation comprises at least one level of indirection.)

FIG. 9 depicts aspects of re-projection in accordance with exemplary practices of the invention, comprising the following:
900. Re-Projection:
(901. Persistent image buffer is re-projected in response to camera movement.)
(902. Re-projection is a selected image warp in response to camera rotation.)
(903. Re-projection utilizes a depth buffer.)
(904. The re-projecting utilizes pixel depth values to increase accuracy of re-projection.)
  (904.1. Pixel depth value is estimated from stereo disparity information.)
  (904.2. Pixel depth value is estimated from information derived from any of a depth sensor, time-of-flight sensor, or structured-light based depth sensor.)
(905. The re-projecting utilizes camera transformation information generated by additional sensors.)
  (905.1. The additional sensors comprise any of at least one accelerometer, gyroscope, or additional camera or set of cameras.)
(906. The re-projecting utilizes camera transformation information generated by a process that interprets data from the same camera or cameras that capture image data, to generate camera transformation information.)
  906.1. The process that interprets data comprises any of simultaneous location and mapping (SLAM), parallel tracking and mapping (PTAM), or dense tracking and mapping (DTAM).)
(907. (a) The re-projecting utilizes camera transformation information resulting from a stereo disparity search executed on de-noised output data: (b) the camera transformation information results from evaluation across a captured frame; and (c) the camera transformation information is utilized to re-project the persistent image buffer stored prior to camera movement.)

FIG. 10 depicts aspects of stereo search with de-noising in accordance with exemplary practices oldie invention, comprising:
1000. Stereo Search with De-Noising:
1001. Utilize at least two temporal de-noising pipelines operable according to the de-noising methods described herein (see, e.g., FIG. 6), each de-noising pipeline being operable to receive image frames from a respective camera:
  (1001.1 Temporal de-noising pipelines comprise processing modules; the processing modules comprising software modules executing on computational resources.)
  (1001.2 Software modules execute on shared computational resources.)
  (1001.3 Temporal de-noising pipelines comprise dedicated electronic components.)

(1001.4 At least two cameras participate in a shutter synchronization protocol.);
1002. Utilize at least one digital memory element to receive output images from the respective de-noising pipelines; and
1003. Utilize a stereo correspondence search module to compare an output image from a first temporal de-noising pipeline with a tentatively corresponding output image from another temporal de-noising pipeline.

FIG. 11 depicts aspects of image metadata and other data accordance with exemplary practices of the invention, comprising the following:
1100. Image Meta-Data, Other Data:
(1101. Buffer data can comprise raw captured pixel information.)
 (1102.1. Image metadata can comprise exposure information from au auto-exposure element.)
 (1102.2. Image metadata can comprise white-balance information from an automatic white-balance element.)
 (1102.3. Image metadata can comprise any of black level information, variable gain amplification information, or exposure time information.)
 (1102.4. Image metadata can comprise information generated by a digital camera pipeline.)
 (1102.5. Image metadata can comprise information describing observations made by sensors.)
 (1102.5.1. The sensors can comprise at least one camera.)
 (1102.6. Image metadata can comprise information describing the magnitude or presence of actions executed by an imaging pipeline.)

FIG. 12 depicts other actions and/or processes in accordance with exemplary practices of the invention, comprising the following:
1200. Other Actions/Processes:
(1201. Utilize a persistent data store to retain information representing the number of valid samples.)
(1202. Utilize the persistent data store to retain information estimating the number of electrons or photons that have been integrated into corresponding data.)
(1203. Imaging pipeline can execute a filter operation.)
(1204. Utilize a cumulative average, in which for a given pixel in a captured frame, a captured pixel value is added to a persistent pixel value, and an effective sample count for the persistent pixel is incremented, and wherein a pixel value for a de-noised frame is produced by dividing the sum of pixel values in the persistent pixel by the associated effective sample count for that pixel.)
(1205. Provide persistent tracking of the statistical deviation for each pixel value from one captured frame to a next captured frame.)
(1206. Utilize a running average, wherein the standard deviation for a given pixel is utilized to determine a weight to assign to a newly captured pixel value, and a weight to assign to previously captured pixel values, to enable blending the captured pixel value and a persistent pixel value in accordance with the weights, to create a de-noised output pixel value.)
(1207. Data corresponding to a captured pixel is blended with data from a corresponding persistent pixel in accordance with a blending ratio, wherein the blending ratio is influenced by metadata from a corresponding captured frame.)
(1208. Metadata from a corresponding captured frame comprises amplification information.)
(1209. Data from a given pixel is normalized with respect to metadata values from a corresponding captured frame, prior to blending.)
(1210. Execute a compression operation on data from a persistent image buffer.)
 (1210.1. The compression is lossless.)
 (1210.2. The compression is lossy.)
 (1210.3 compression operation executed in accordance with a selected compression scheme.)
  (1210.3.1 selected compression scheme based at least in part on an observation that spatially proximate pixels often have similar values.)
(1211. Construct lookup table that can be used for all, or substantially all, pixel values in a given frame.)
(1212. Execute de-noising operations utilizing computational resources within the digital camera pipeline.)
(1213. Computational resources within the digital camera pipeline comprise dedicated hardware elements.)
(1214. Utilize analog information directly generated by digital camera pipeline.)
(1215. For a given pixel, interpret each color component value independently of other color component values.)
(1216. Estimate noise in one color channel of a given pixel without regard to values of other color channels for the given pixel.)
(1217. Construct statistical noise model having different parameters for different color channels, to account for differences in sensitivity between different color channels of a given digital camera.)
 (1217.1. The different parameters for different color channels comprise a different electron well capacity for a given color channel.)
 (1217.2. The different parameters for different color channels comprise: allocating additional sampling to a given color channel.)
 (1217.3. The different parameters for different color channels comprise: executing a selected transformation or adjustment differently for a given color channel.)
(1218. For a given pixel, utilize combined pixel value encoding compound color value.)
(1219. For a given pixel, utilize an independent-color color space and reduce pixel value to a scalar (quantity.)
 (1219.1. The independent-color color space is an RGB color space.)
 (1219.2.1. Reducing pixel value to a scalar quantity is executed by calculating the magnitude of the corresponding 3-dimensional color vector using the Pythagorean theorem.)
 (1219.2.2. Reduce pixel value to a scalar quantity is executed by utilising only the value of the largest component of the corresponding color vector.)
  (1219.2.2.1 Approximate a color vector magnitude.)
(1220. Utilize a combined-color color space and executing noise estimation utilizing the luminance channel alone.)
 (1220.1 the combined-color color space is a YUV color space.)

Block Diagram(s) of Exemplary Embodiments of the Invention

Figure 13:
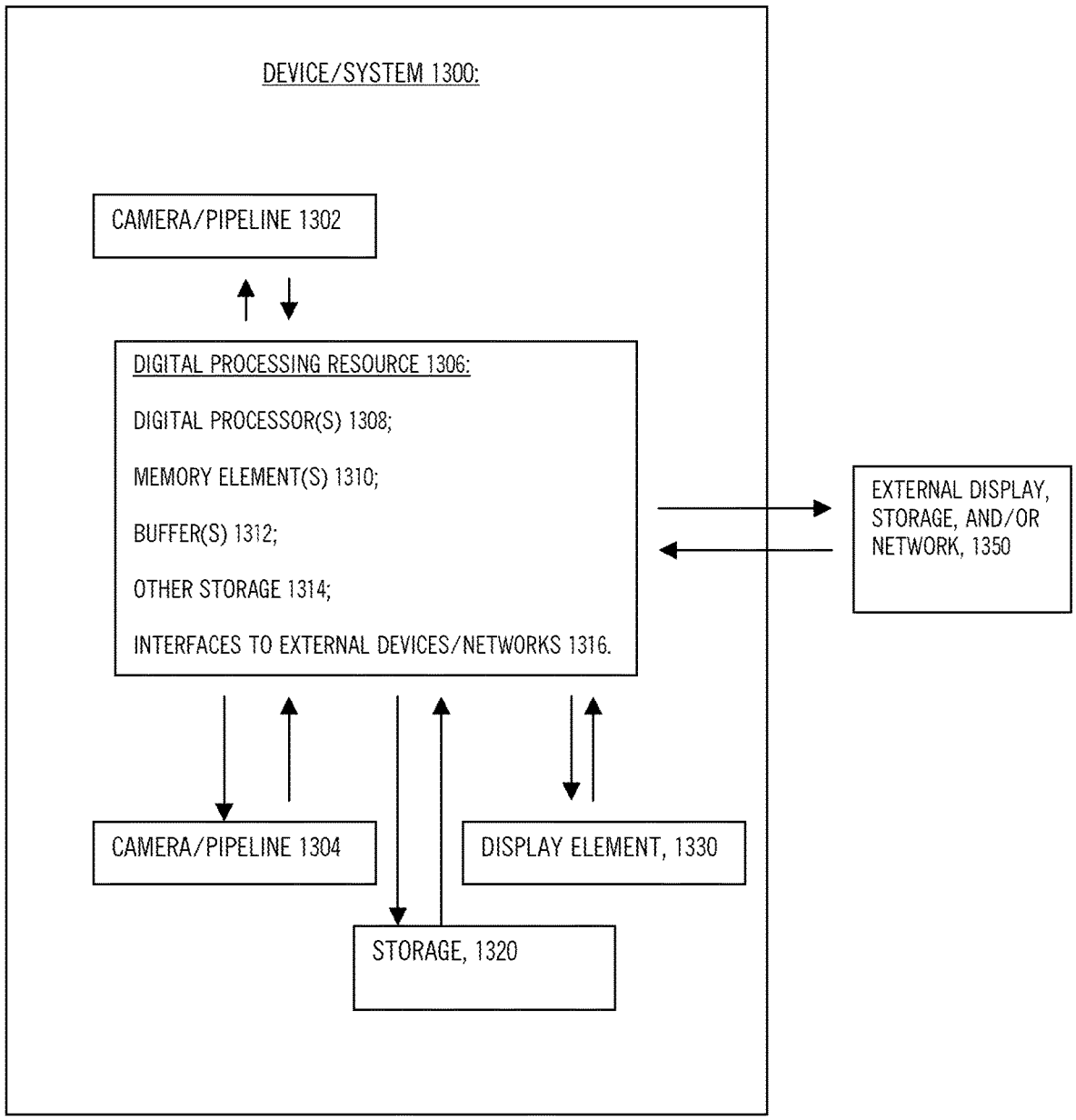
FIG. 13 is a schematic block diagram depicting exemplary devices or systems in which aspects of the present invention may be practiced or embodied.

FIG. 13 is a schematic block diagram depicting exemplary devices or systems in which aspects of the present invention may be practiced or embodied.

In particular, FIG. 13 is a schematic block diagram showing a device or system 1300 in which the invention may be practiced. The device or system 1300 may be implemented using known forms of digital processing hardware, such as known forms of smartphones, tablets and/or other forms of digital processing and imaging devices, supplemented as necessary in accordance with the teachings of the present invention. Arrows in FIG. 13 indicate flow of digital data and/or signals between elements.

By way of example, device of system 1300 can comprise at least a first digital camera or camera pipeline 1302, a second digital camera or can pipeline 1304, and a digital processing resource 1306 comprising one or more digital processor(s) 1308, memory element(s) 1310, buffer(s) 1312, other storage 1314, and interfaces 1316 to external devices and/or networks.

In accordance with the teachings of the invention, such as discussed above in connection with FIGS. 2, 3, et seq., the digital processing resource 1306 is operable to receive digital data from the cameras or camera pipelines 1302, 1304, process the data in accordance with the invention, and provide outputs, based on such processing, to internal (i.e., within device or system 1300) display element 1330 or storage 1320; and/or to external display, storage or network elements (collectively 1350).

The external display, storage or network elements 1350 may comprise the Internet, devices, processors or other networks connected to or via the Internet, or other network-connected elements or destinations.

In addition, the digital processing resource may receive or consume digital information from such a network or networks 1350.

Those skilled in the art will understand that a number of the physical hardware and processing elements discussed in connection with FIG. 13 can be provided by structures found in commercially available smartphones, tablet computing devices, and other such devices, when configured and operated in accordance with exemplary practices of the present invention, and supplemented by additional hardware elements, such as additional cameras and/or other sensors, as may be required by the present invention. The digital processor(s) of the digital processing resource can be of conventional design, such as those found in commercially available smartphones, tablet computing devices, and other such devices, when configured and operated in accordance with exemplary practices of the present invention.

CONCLUSION

While the foregoing description and the accompanying drawing figures provide details that will enable those skilled in the art to practice aspects of the invention, it should be recognized that the description is illustrative in nature and that many modifications and variations thereof will be apparent to those skilled in the art having the benefit of these teachings. It is accordingly intended that the invention herein be defined solely by any claims that may be appended hereto and that the invention be interpreted as broadly as permitted by the prior art.

We claim:

1. A method for executing stereo image search between corresponding images generated by at least two cameras, the method comprising:
   A. utilizing at least two de-noising pipelines, each operable to receive image frames from a respective camera;
   B. utilizing at least one digital memory element to receive output images from the respective de-noising pipelines; and
   C. utilizing a stereo correspondence module to compare an output image from a first de-noising pipeline with a tentatively corresponding output image from another de-noising pipeline, thereby executing a stereo image search;
   wherein utilizing at least two de-noising pipelines comprises:
   (a) receiving at least one frame of image pixel data from a digital camera pipeline;
   (b) receiving image metadata corresponding to the at least one received frame; and
   (c) executing temporal de-noising operations for at least selected pixels of the at least one received frame of image pixel data.

2. The method of claim 1 further comprising:
   utilizing at least one temporal de-noising digital processing resource comprising at least one software module.

3. The method of claim 1 further comprising:
   utilizing at least one temporal de-noising digital processing resource comprising dedicated electronic components.

4. The method of claim 1 wherein at least two digital cameras participate in a shutter synchronization protocol.

5. The method of claim 1 further comprising:
   applying an output from the noise model to a video signal, to improve suitability of the signal as an input to a stereo disparity search operation.

6. The method of claim 1 wherein at least one de-noising pipeline interpolates between coefficients in a lookup table.

7. The method of claim 6 wherein at least one lookup table is generated in response to metadata associated with at least one received frame.

8. The method of claim 1 wherein at least one de-noising pipeline provides persistent tracking of statistical deviation for each pixel value from one captured frame to a next captured frame.

9. The method of claim 1 wherein executing temporal de-noising operations comprises:
   (1) evaluating a noise model to estimate the noise present in a selected pixel from the at least one received frame;
   (2) blending data from a persistent image buffer with data from the at least one received frame;
   (3) updating data in the persistent image buffer; and
   (4) outputting the blended pixel data to a reduced-noise frame buffer, thereby to generate a reduced-noise image frame.

10. The method of claim 1 wherein image metadata comprises exposure information from an auto-exposure element.

11. The method of claim 1 wherein image metadata comprises white-balance information from an automatic white-balance element.

12. The method of claim 1 wherein image metadata comprises any of black level information, variable gain amplification information, or exposure time information.

13. The method of claim 1 wherein image metadata comprises information generated by a digital camera pipeline.

14. The method of claim 1 wherein image metadata comprises information describing observations made by sensors.

15. The method of claim 1 wherein image metadata comprises information describing the magnitude or presence of actions executed by an imaging pipeline, and an action executed by an imaging pipeline comprises a filter operation.

16. The method of claim 1 further comprising: executing the de-noising operations utilizing computational resources within the digital camera pipeline.

17. The method of claim 1 further comprising: for a given pixel, interpreting each color component value independently of other color component values.

18. The method of claim 1 further comprising: constructing a statistical noise model having different parameters for different color channels, to account for differences in sensitivity between different color channels of a given digital camera.

19. A system for executing stereo image search between corresponding images generated by at least two cameras, the system comprising:
A. at least two de-noising pipelines, each operable to receive image frames from a respective camera;
B. at least one digital memory element operable to receive output images from the respective de-noising pipelines; and
C. a stereo correspondence module operable to compare an output image from a first de-noising pipeline with a tentatively corresponding output image from another de-noising pipeline, thereby executing a stereo image search;
wherein at least one de-noising pipeline is operable to:
(a) receive at least one frame of image pixel data from a digital camera pipeline;
(b) receive image metadata corresponding to the at least one received frame; and
(c) execute temporal de-noising operations for at least selected pixels of the at least one received frame of image pixel data.

20. A program product for use with a digital processing system to enable the digital processing system to execute stereo image search between corresponding images generated by at least two cameras, the digital processing system comprising a digital processing resource, the digital processing resource comprising at least one digital processor, the program product comprising digital processor-executable program instructions stored on a non-transitory digital processor-readable medium, which when executed in the digital processing resource cause the digital processing resource to:
A. utilize at least two de-noising pipelines, each operable to receive image frames from a respective camera;
B. utilize at least one digital memory element to receive output images from the respective de-noising pipelines; and
C. utilize a stereo correspondence module to compare an output image from a first de-noising pipeline with a tentatively corresponding output image from another de-noising pipeline, thereby executing a stereo image search;
wherein utilizing at least two de-noising pipelines comprises:
(a) receiving at least one frame of image pixel data from a digital camera pipeline;
(b) receiving image metadata corresponding to the at least one received frame; and
(c) executing temporal de-noising operations for at least selected pixels of the at least one received frame of image pixel data.

* * * * *